US011525890B2

(12) United States Patent
Chan et al.

(10) Patent No.: US 11,525,890 B2
(45) Date of Patent: Dec. 13, 2022

(54) COOPERATIVE TARGET TRACKING AND SIGNAL PROPAGATION LEARNING USING MOBILE SENSORS

(71) Applicant: The Hong Kong University of Science And Technology, Kowloon (HK)

(72) Inventors: Shueng Han Gary Chan, New Territories (HK); Jiajie Tan, New Territories (HK)

(73) Assignee: The Hong Kong University of Science And Technology, Kowloon (HK)

( * ) Notice: Subject to any disclaimer, the term of this patent is extended or adjusted under 35 U.S.C. 154(b) by 571 days.

(21) Appl. No.: 16/550,711

(22) Filed: Aug. 26, 2019

(65) Prior Publication Data

US 2020/0064446 A1 Feb. 27, 2020

Related U.S. Application Data

(60) Provisional application No. 62/765,051, filed on Aug. 27, 2018.

(51) Int. Cl.
*G01S 7/41* (2006.01)
*H04B 17/318* (2015.01)
*G06N 7/00* (2006.01)

(52) U.S. Cl.
CPC ............. *G01S 7/415* (2013.01); *G01S 7/418* (2013.01); *G06N 7/005* (2013.01); *H04B 17/318* (2015.01)

(58) Field of Classification Search
CPC ................................ G01S 7/415; G01S 7/418
(Continued)

(56) References Cited

U.S. PATENT DOCUMENTS

| 6,498,565 | B2 | 12/2002 | Boulay et al. |
| 2005/0105600 | A1* | 5/2005 | Culum ............. G01S 5/04 375/150 |
| 2010/0039284 | A1 | 2/2010 | Hall et al. |

FOREIGN PATENT DOCUMENTS

| EP | 2 179 600 B1 | 7/2015 |
| EP | 2 979 494 A1 | 2/2016 |

(Continued)

OTHER PUBLICATIONS

Hu et al., "Localization for Mobile Sensor Networks", 10th Annual International Conference on Mobile Computing and Networking, Sep. 26-Oct. 1, 2004, 13 pages.
(Continued)

*Primary Examiner* — Bo Fan
(74) *Attorney, Agent, or Firm* — Amin, Turocy & Watson, LLP

(57) ABSTRACT

An architecture is provided for cooperative target tracking and signal propagation learning using mobile sensors. A method can comprise as a function of sensing data representative of a location of a target device at a first defined moment and model data relating to a motion model representing a probability density function, determining, by a system comprising a processor, a group of locations for the target device at a second defined time point, wherein the probability density function facilitates determining, based on the location of the target device at the first defined moment, a current location of the target device at a third defined moment; and as a function of the group of locations, generating, by the system, a data structure representing a matrix of received signal strength values; and identifying, by the system, a location of the group of locations for the target device at the third defined moment based on the data structure.

20 Claims, 17 Drawing Sheets

(58) Field of Classification Search
USPC .................................. 342/28, 378, 463, 181
See application file for complete search history.

(56) References Cited

FOREIGN PATENT DOCUMENTS

| HK | 1143688 B | 4/2016 |
|---|---|---|
| WO | 2012/094456 A1 | 7/2012 |
| WO | 2014/158062 A1 | 2/2014 |
| WO | 2017/117654 A1 | 7/2017 |

OTHER PUBLICATIONS

Xinrong Li, "Collaborative Localization With Received-Signal Strength in Wireless Sensor Networks", IEEE Transactions On Vehicular Technology, vol. 56, No. 6, Nov. 2007, pp. 3807-3817.
Shang et al., "Localization from Connectivity in Sensor Networks", IEEE Transactions On Parallel And Distributed Systems, vol. 15, No. 10, Oct. 2004, 14 pages.
Shang et al., "Improved MDS-Based Localization", IEEE Computer and Communications Societies vol. 4., 2004, 12 pages.
Bahl et al., "RADAR: an in-building RF-based user location and tracking system," INFOCOM2000, Nineteenth Annual Joint Conference of the IEEE Computer and Communications Societies. Proceedings. IEEE, vol. 2, 2000, 10 pages.
Bhuiyan et al., "Local Area Prediction-Based Mobile Target Tracking in Wireless Sensor Networks", IEEE Transactions on Computers, vol. 64, Jul. 1, 2015, 14 pages.
Chan et al., "Collaborative Localization: Enhancing WiFi-Based Position Estimation with Neighborhood Links in Clusters", Pervasive Computing, 2006, pp. 50-66.
Chen et al., "Cluster Based Iterative GPS-Free Localization for Wireless Sensor Networks", IEEE 73rd Vehicular Technology Conference (VTC Spring), May 15-18, 2011, 5 pages.
Shen et al., "Scalable Cooperative Localization with Minimal Sensor Configuration", Springer, Tokyo, Japan, 2016, 15 pages.
Freitas et al., "Super MDS: Source Location from Distance and Angle Information", IEEE Wireless Communications and Networking Conference, 2007, 5 pages.
Musa et al., "Tracking Unmodified Smartphones Using Wi-Fi Monitors", In Proceedings of the 10th ACM conference on embedded network sensor systems, Nov. 6-9, 2012, 14 pages.
Hook et al., "Algorithms for Cooperative Active Localization of Static Targets With Mobile Bearing Sensors Under Communication Constraints", IEEE Transactions On Robotics, vol. 31, No. 4, Aug. 2015, pp. 864-876.
Youssef et al., "The Horus WLAN Location Determination System", Proceedings of the 3rd international conference on Mobile systems, applications, and services, Jun. 6-8, 2005, pp. 205-2018.
Bishop et al., "Pattern Recognition and Machine Learning," Springer Science+Business Media, LLC, 2006, 758 pages.
Durrett et al., "Probability: Theory and Examples," 4th ed., Cambridge University Press, 2010, 490 pages.
Rappaport et al., "Wireless communications principles and practice," Prentice Hall PTR, 2002, 640 pages.
Adib et al., "3D Tracking via Body Radio Reflections," in NSDI, vol. 14., Apr. 2-4, 2014, 14 pages.
Agate et al., "Statistics of the RSS Estimation Algorithm for Gaussian Measurement Noise," IEEE Transactions on Signal Processing, vol. 47, No. 1, Jan. 1999, 11 pages.
Akai et al., "Gaussian processes for Magnetic Map-Based Localization in Large-Scale Indoor Environments", Sep. 28-Oct. 2, 2015, pp. 4459-4464.
Alomari et al., "New Path Planning Model for Mobile Anchor-Assisted Localization in Wireless Sensor Networks," Wireless Networks, Mar. 20, 2017, pp. 1-19.
Borg et al., "Modern multidimensional scaling: Theory and applications", 1em plus 0.5em minus 0.4em NY, USA: Springer Science & Business Media, 2005.
Brajdic et al., "Walk detection and step counting on unconstrained smartphones," in Proceedings of the 2013 ACM international joint conference on Pervasive and ubiquitous computing, ACM, Sep. 8-12, 2013, pp. 225-234.
Chen et al.,"Sequential monte carlo for simultaneous passive device-free tracking and sensor localization using received signal strength measurements," in Information Processing in Sensor Networks (IPSN), 2011 10th International Conference on, IEEE, Apr. 12-14, 2011, 12 pages.
Cheng et al., "Mil: a mobile indoor localization scheme based on matrix completion," in Communications (ICC), IEEE ICC 2016 Ad-hoc and Sensor Networking Symposium, 2016, 5 pages.
Das et al., "Algorithmic aspects of sensor localization," in Theoretical aspects of distributed computing in sensor networks. 1em plus 0.5em minus 0.4em Berlin, Heidelberg, German: Springer, 2011, pp. 257-291.
Doucet et al.,"Rao-blackwellised particle filtering for dynamic bayesian networks," in Proceedings of the Sixteenth conference on University in artificial intelligence, 2000, pp. 176-183.
Fan et al.,"Citymomentum: an online approach for crowd behavior prediction at a citywide level," in Proceedings of the 2015 ACM International Joint Conference, Sep. 7-11, 2015 pp. 559-569.
Fu et al., "Crowdsourcing-based wifi fingerprint update for indoor localization," in Proceedings of the ACM Turing 50th Celebration Conference—China, ACM, Sep. 7-11, 2017, 9 pages.
Halder et al.,"A survey on mobile anchor assisted localization techniques in wireless sensor networks," Wireless Networks, vol. 22, No. 7, pp. 2317-2336, 2016.
Halperin et al., "Tool release: Gathering 802.11 n traces with channel state information," ACM SIGCOMM Computer Communication Review, vol. 41, No. 1, pp. 53-53, 2011.
Han et al., "A disaster management-oriented path planning for mobile anchor node-based localization in wireless sensor networks," IEEE Transactions on Emerging Topics in Computing, vol. 0, No. 0, p. 0, Mar. 27, 2017, 12 pages.
He et al., "Calibration-free fusion of step counter and wireless fingerprints for indoor localization," in Proceedings of the 2015 ACM, Sep. 7-11, 2015, pp. 897-908.
He et al., "Wi-fi fingerprint-based indoor positioning: Recent advances and comparisons," IEEE Communications Surveys & Tutorials, vol. 18, No. 1, 2016, pp. 466-490.
He et al., "Sectjunction: Wi-Fi indoor localization based on junction of signal sectors," IEEE International Conference on Communications (ICC), Jun. 2014, pp. 2605-2610.
He et al., "Tilejunction: Mitigating Signal Noise for Fingerprint-Based Indoor Localization," IEEE Transactions on Mobile Computing, vol. 15, No. 6, Jun. 2016 pp. 1554-1568.
Karim et al.,, "Range-free localization approach for m2m communication system using mobile anchor nodes," Journal of Network and Computer Applications, vol. 47, pp. 137-146, 2015.
Lee et al.,"An efficient three-dimensional localization scheme using trilateration in wireless sensor networks," IEEE Communications Letters, vol. 18, No. 9, 2014, pp. 1591-1594.
Li et al."Fine-grained indoor tracking by fusing inertial sensor and physical layer information in wlans," IEEE International Conference on Communications, 2016, 7 pages.
Liu et al., "A joint time synchronization and localization design for mobile underwater sensor networks," IEEE Transactions on Mobile Computing, vol. 15, No. 3, , 2016, 14 pages.
P. Misra and P. Enge, "Global positioning system: signals, measurements and performance," Massachusetts: Ganga-Jamuna Press, Second Edition, 2006, 295 pages.
Montemerlo et al., "Fastslam: A factored solution to the simultaneous localization and mapping problem," in Aaai/iaai. 1em plus 0.5em minus 0.4em Edmonton, Alberta, Canada: American Association for Artificial Intelligence, 2002, pp. 593-598.
Oliva et al., "Sensor networks localization: Extending trilateration via shadow edges," IEEE Transactions on Automatic Control, vol. 60, No. 10, 2015, pp. 2752-2755.
Oliveira et al.,"Rssi-based relative localisation for mobile robots," Ad Hoc Networks, vol. 13, pp. 321-335, 2014.
Porta et al., "Sensor localization from distance and orientation constraints," Sensors, vol. 16, No. 7, pp. 1096, 2016.

(56) References Cited

OTHER PUBLICATIONS

Schröder et al., "Poster: Nlos-aware localization based on phase shift measurements," in Proceedings of the 21st Annual International Conference on Mobile Computing and Networking, ACM. 1em plus 0.5em minus 0.4em Paris, France: ACM, 2015, pp. 224-226.

Suh et al., "Vision-based coordinated localization for mobile sensor networks," IEEE transactions on automation science and engineering, vol. 13, No. 2, pp. 611-620, 2016.

Thiagarajan et al., "Vtrack: accurate, energy-aware road traffic delay estimation using mobile phones," in Proceedings of the 7th ACM conference on embedded networked sensor systems, ACM. 1em plus 0.5em minus 0.4em Berkeley, CA, USA: ACM, 2009, pp. 85-98.

Tian et al., "Improve accuracy of fingerprinting localization with temporal correlation of the rss," IEEE Transactions on Mobile Computing, vol. 17, No. 1, pp. 113-126, 2017.

Tomic et al., "Rss-based localization in wireless sensor networks using convex relaxation: Noncooperative and cooperative schemes," IEEE Transactions on Vehicular Technology, vol. 64, No. 5, pp. 2037-2050, 2015.

Vaghefi et al., "Cooperative joint synchronization and localization in wireless sensor networks." IEEE Trans. Signal Processing, vol. 63, No. 14, pp. 3615-3627, 2015.

Vasisht et al., "Decimeter-level localization with a single wifi access point," in NSDI. 1em plus 0.5em minus 0.4em Santa Clara, CA, USA: Usenix, 2016, pp. 165-178.

Xie et al., "Maloc: A practical magnetic fingerprinting approach to indoor localization using smartphones," in Proceedings of the 2014 ACM International Joint Conference on Pervasive and Ubiquitous Computing, ACM. 1em plus 0.5em minus 0.4em Seattle, WA, USA: ACM, 2014, pp. 243-253.

Xie et al., "A reliability-augmented particle filter for magnetic fingerprinting based indoor localization on smartphone," IEEE Transactions on Mobile Computing, vol. 15, No. 8, pp. 1877-1892, 2016.

Xu et al., "Idyll: Indoor localization using inertial and light sensors on smartphones," in Proceedings of the 2015 ACM International Joint Conference on Pervasive and Ubiquitous Computing, ACM. 1em plus 0.5em minus 0.4em Osaka, Japan: ACM, 2015, pp. 307-318.

Yang et al., "Quality of trilateration: Confidence-based iterative localization," IEEE Transactions on Parallel and Distributed Systems, vol. 21, No. 5, pp. 631-640, 2010.

Zhang et al., "Accurate range-free localization for anisotropic wireless sensor networks," ACM Transactions on Sensor Networks (TOSN), vol. 11, No. 3, p. 51, 2015.

Zhao et al., "Radio tomographic imaging and tracking of stationary and moving people via kernel distance," in Proceedings of the 12th international conference on Information processing in sensor networks, ACM/IEEE. 1em plus 0.5em minus 0.4em Philadelphia, PA, USA: IEEE, 2013, pp. 229-240.

* cited by examiner

200 ⟶

ALGORITHM 1: Efficient RSS Matrix Generation

1. Initialize particles.
2. while *there is new sensing data collection* do
3.    foreach *particle* do
4.       | Predict sensor locations through motion model.
5.    end
6.    foreach *particle* do
7.       | Estimate local RSS matrix in each particle according to Equations 15 or 16.
8.    end
9.    Update weights for particles according to Equation 11.
10.   Yield the sensor locations according to Equation 14.
11.   Yield the RSS matrix according to Equation 17.
12.   Resample particles.
13. end

FIG. 5

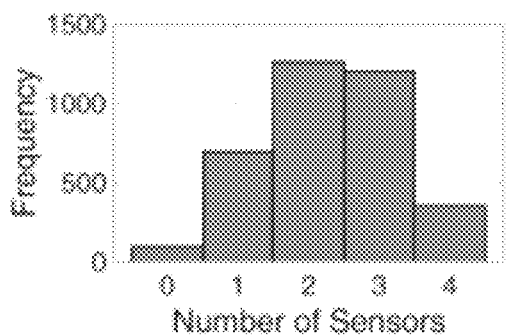
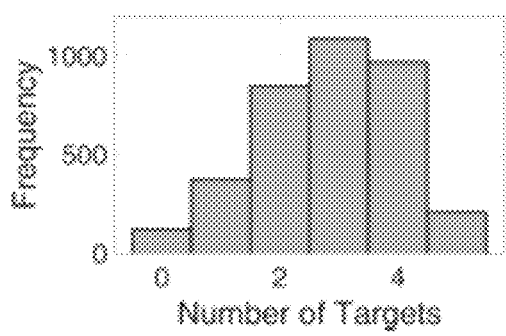
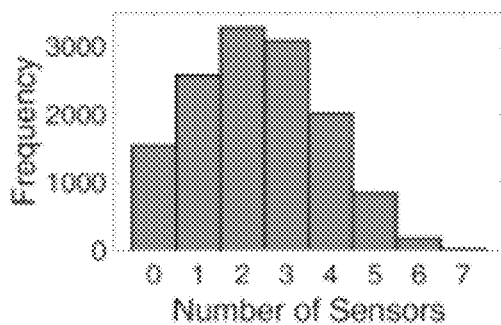
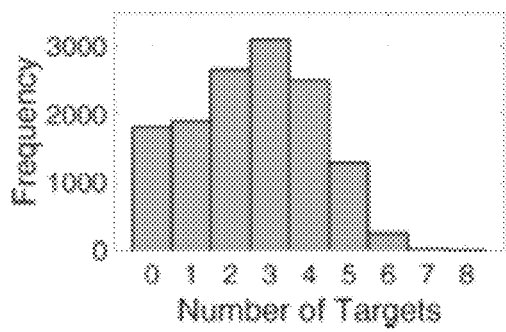
(a) Sensors in coverage (campus).
(b) Target in coverage (campus).
(c) Sensor in coverage (mall).
(d) Target in coverage (mall).
FIG. 6

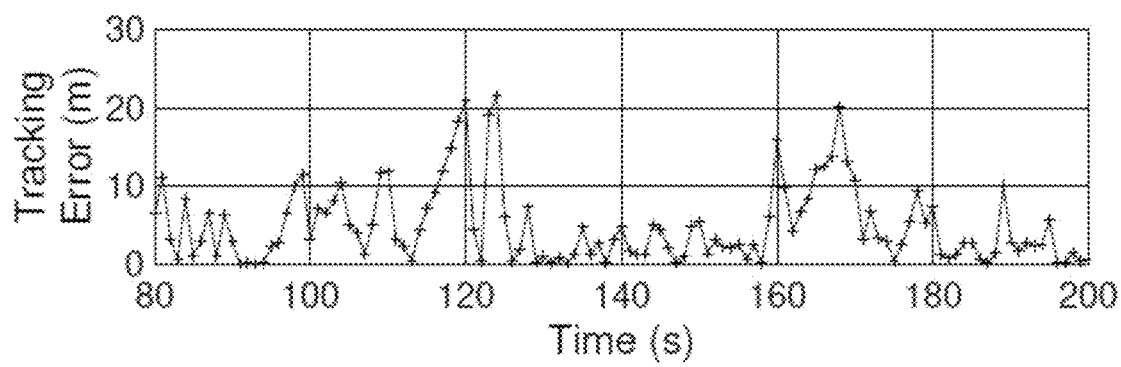
(a) Tracking error of a target over time.
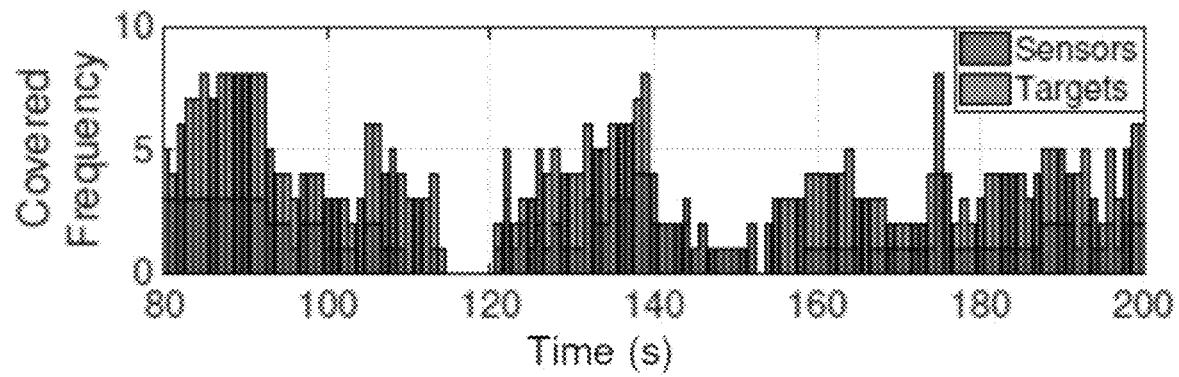
(b) The number of sensor/traget in the target coverage over time.
FIG. 7

COOPERATIVE TARGET TRACKING AND SIGNAL PROPAGATION LEARNING USING MOBILE SENSORS

CROSS REFERENCE TO RELATED APPLICATIONS

This application claims priority to U.S. Provisional Patent Application Ser. No. 62/765,051, titled: "COOPERATIVE TARGET TRACKING AND SIGNAL PROPAGATION LEARNING USING MOBILE SENSORS," filed Aug. 27, 2018, the disclosure of which is hereby incorporated herein by reference in its entirety.

TECHNICAL FIELD

The disclosed subject matter provides for cooperative target tracking and signal propagation learning using mobile sensors.

BACKGROUND

Target tracking generally refers to knowing a location of mobile objects over a discernible duration of time. Target tracking can have wide and varied applications. For example, target tracking can have applicability in identifying and tracking patients in hospital settings, understanding flows of individuals (and/or assets/objects) in large enclosed (e.g., bounded) venues, such as shopping malls, warehouses, manufacturing locations and the like. Target tacking can also be employed to locate individuals in areas such as amusement parks, airports, etc.

BRIEF DESCRIPTION OF DRAWINGS

FIG. 5 provides illustration of a process for generation of RSS matrices for cooperative target tracking and signal propagation learning using mobile sensors, in accordance with aspects of the subject disclosure.

FIG. 6 provides depiction of histograms of the number of sensor devices/target devices in a coverage area of target devices in different venues, in accordance with aspects of the subject disclosure.

FIG. 7 illustrates tracking errors and the number of devices covered by a target device as measured over a defined time horizon, in accordance with aspects of the subject disclosure.

DETAILED DESCRIPTION

Figure 1:
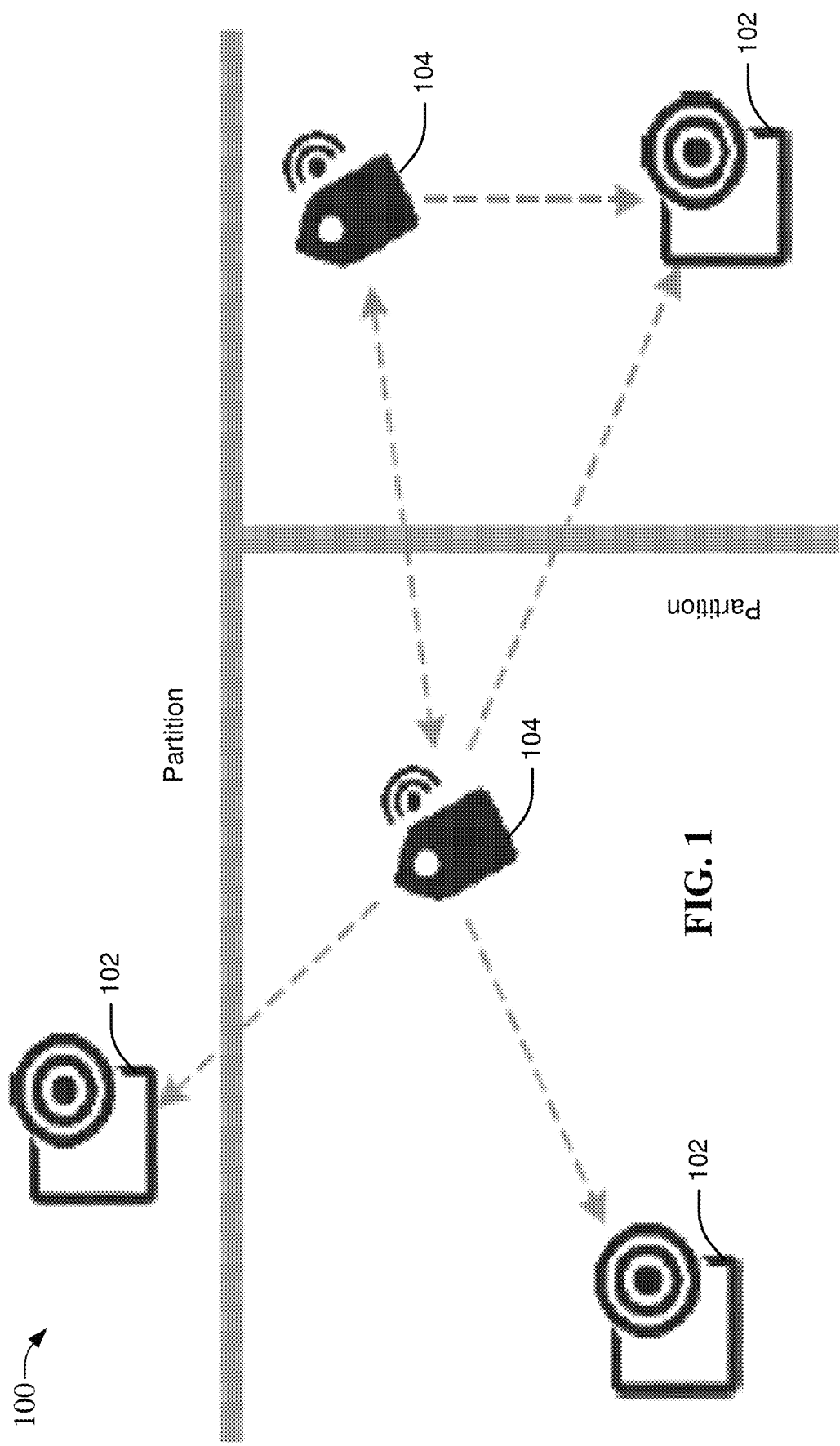
FIG. 1 is an illustration of a system for cooperative target tracking and signal propagation learning using mobile sensors, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The subject disclosure provides systems and/or methods that can track targets (e.g., people, objects, and/or assets) in defined or definable bounded areas. In various embodiments, each target can carry a device which can continuously compute the location of the target and can report the computed location to a server device of a collection of server devices. Each device can, for instance, be equipped with (or can comprise), in addition to one or more processors and/or memories, sensing modules/devices, localization modules/devices, and/or communication (transceiver) modules/devices. In additional and/or alternative embodiments, a plurality of sensor devices can be variously dispersed (e.g., randomly scattered and/or positioned in a determined or definable pattern) throughout one or more areas enclosed within determined or definable perimeters, such that when a target (e.g., person or object) associated with a tag device (e.g., radio frequency identification (RFID) label, Wi-Fi tag, etc.) interacts with one or more of the distributed sensor devices (e.g., RFID reader, Wi-Fi sniffer, etc.), the sensor devices can identify the target (e.g., via the tag device) and report the location of the target to a server device of the collection of server devices.

In further additional and/or alternative embodiments, rather than employing pluralities of fixed or stationary sensor device widely distributed throughout areas enclosed within defined or determinable boundaries, mobile sensor devices can be carried by personnel, such as hospital staff, security staff, mall patrols, . . . . Such mobile sensor devices can generally be capable of determining their own location based on localization functionalities and/or facilities, such a using one or more functionality/facility associated with global positioning system (GPS) technologies, Wi-Fi fingerprinting (e.g., using one or more received signal strength indicator (RSSI) value received from one or more communication device (e.g., base station devices, eNodeB devices, access point devices, picocell devices, femtocell devices, Smartphone device, . . . ) that can be in wired and/or wireless communication with a mobile sensor device to determine a current location (e.g., a positional longitudinal coordinate and/or positional latitudinal coordinate) with respect to the one or more communication device), and/or use of multiple-input multiple-output (MIMO) time-of-flight (TOF) determinations (e.g., MIMO TOF measurements). As noted earlier, the mobile sensor device can be carried on the person of, for example, hospital staff, in-patients, security guards, mall patrols, etc. Therefore, the mobile sensor device can be a low-cost light weight active device (e.g., a portable tag device) comprising at least transceiver with which the mobile sensor device can broadcast and/or receive beacons from other mobile sensor devices that can similarly include one or more transceiver aspect. Broadcast beacons broadcast by other mobile sensor devices can be opportunistically captured by the mobile sensor device. Captured beacons can subsequently be transmitted (e.g., relayed or forwarded) to a server device of a collection of server devices for, if necessary, additional analysis and/or processing. Based on the broadcast beacons that can comprise beacon information and mobile sensor device locations determined, for example, by processing functionalities and/or facilities included with a mobile sensor device and/or the server device of the collection of server devices, target locations of targets (e.g., peoples, assets, tangible objects, etc.) can be computed. In this regard it should be noted that mobile sensor devices, in addition to comprising transceiver functionalites and facilities can also comprise localization capabilities and/or communication functions, as well as computing and wired and/or wireless networking capabilities. Mobile sensor devices can typically be mobile (e.g., can at various instances in time transit through disparate areas enclosed within defined or determinable boundaries and/or can at other times be stationary, albeit for limited durations or temporarily) and can be dynamically deployed to different areas. Such an approach it has been observed employs fewer mobile sensors when compared with infrastructures where sensors are statically located and distributed through a venue. For purposes of this disclosure, without limitation or loss of generality, both mobile sensor devices and target devices can be mobile.

Further, for ease of exposition, the subject disclosure is described in the context of radio frequency (RF) signals such as Wi-Fi (e.g., a grouping of radio technologies commonly used for the wireless local area networking (WLAN) of devices, the radio technologies are based around the institute of electrical and electronics engineers (IEEE) 802.11 family of standards) and/or protocol standards based on Bluethooth (e.g., a wireless personal area network technology) low energy proximity sensing by transmission of universally unique identifiers, such as iBeacon. Selection of these RF signal types is due to their general cost-effectiveness and their typical ease of deployment. Moreover, transceiving modules using these technologies are easilily accessible in the market and have been widely embedded into different mobile devices. Additionally, these RF signal types can also be easily detected in terms of received signal strengths (RSS).

In accordance with various embodiments, RF-based positioning issues can generally be treated as localizing stationary targets with static sensors and leveraging pre-deployed network infrastructures, such as access points (AP) and iBeacons, to determine target locations, via, for example, tri-lateration that can employ range-based schemes, which estimate the distance between nodes using signal measurements, e.g., RSS and ToA (Time of Arrival). Performance of such schemes can however be hampered by non-line-of-sight (NLOS) measurement. Other solutions have been range-free solutions, wherein in various embodiments a fingerprinting approach has been considered, wherein signal patterns at predefined positions can be recorded as unique fingerprints. Then, according to these embodiments, the location estimation problem becomes a search for matched fingerprints. In accordance with these embodiments, these solutions generally cast target localization as a per-time-slot estimation issue, and hence typically do not take the mobility of targets into consideration.

Additional embodiments have considered localizing mobile targets (e.g., targets that are in motion) with fixed sensor devices over defined or defineable time horizons, whereby Bayesian filtering can be typically applied to track targets. The basic idea in accordance with these embodiments is to combine signal measurements with the motion of targets. Trajectory estimation based on, for instance, Viterbi map-matching to improve tracking accuracy with a limited number of sensor devices has proven beneficial. Further, in the context of localizing mobile targets, it can be assumed that each target is independent in order to simplify the system. The subject disclosure considers both temporal and/or cooperative information among targets to extend tracking coverage as well as to improve accuracy.

In accordance with further embodiments consideration has been had to tracking mobile targets with mobile sensor devices. In accordacne with various embodiments, particle filters can be used to combine target motion models and sensor measurements for target tracking. Alternative embodiments plan the moving trajectories of mobile sensor devices for better localization performances. Generally, the efficacy of these embodiments can be dependent on sensor device density and sensor device trajectory. Thus in accordance with described embodiments, the disclosed systems and/or methods leverage both cooperation among devices and associated temporal data or temparal information to constrain the targets even when the targets are out of the sensing coverage.

In accordance with some embodiments, cooperative localization has been adopted, where each device (mobile sensor device, sensor device, and/or target device) calculates its own position by analyzing signal distances from each of its neighboring devices. Some embodiments determine relative positions between devices using MDS (Multi-dimensional Scaling) due to the techniques computational efficiency. However, in these embodiments, the requirement for a line or sight (LOS) between devices can hinder application of these embodiments when the defined area is complex.

Therefore, in various preferred embodiments as discribed herein, the concept of RSS matrices is employed to cater for such complex environments.

As a brief overview, the subjet application provides a cooperative, cost-effective and highly accurate system using mobile sensor devices to track multiple targets. Generally, RF signals emitted from target devices or tag devices (e.g., RFID tags, etc.) can have a defined or determinable coverage range that can be sensed, for example, by a sensor device. When sensor devices are sparsely scattered with respect to beacon coverage, some target devices or tag devices may not be sensed, let alone tracked. To overcome this, the subject application provides that target devices or tag devices cooperatively rebroadcast received beacons associated with target devices or tag devices other than itself within a defined or defineable hop limit away. In other words, the defined or definable hop limit can provide and define a limited exisistence time or defined lifetime for the beacons. Providing a defined existence tome or defined lifetime can greatly extends a sensing scope of a sensor device and accordingly achieves much better trackability in terms of continuity and accuracy.

Traditionally, in order to model signal propagation, some approaches have assumed line-of-sight (LOS) scenarios by using simple fading formulas. While this can be efficacious in open or outdoor spaces, these approaches generally do not work well for complex indoor environments due to fading, multipath and shadowing. To overcome these hinderances, the subject application utilizes a general concept of RSS matrices to capture signal propagation between any two locations, where a matrix entry at (i, j) can be the RSS received at point j for a transmitter at point i. In such way, a RSS matrix does not require any propagation model, and can provide spatial information between a transmitting device and receiver device given a received RSS. The RSS matrix conception disclosed herein can be applied in any environment. For simple environments where signal propagation can be approximated by a fading model, the RSS matrix can be straightforwadly generated using that model.

In accordance with one or more embodiments, the subject application solves the following cooperative target tracking problem: given an RSS matrix, RSS measurements for tags (e.g., target devices and/or tag devices) and sensor devices and sensor device locations, how can target devices or tag devices be efficiently localized over time defined time periods? The disclosed systems and methods provide an efficient process to address that. In embodiments, a modified particle filter, which constrains tag device or target device locations by means of temporal and spatial information. Rather than tracking a single target at a time, the disclosed systems and methods takes advantage of the spatial relationship among target devices and/or tag devices as determined from the generated RSS matrix, and jointly considers temporal target movements.

The RSS matrix can be an important input for the disclosed systems and/or method, as such this disclosure describes facilities to efficiently obtain RSS matrices without any model assumptions and/or explicit site surveys. Generally, site surveys can be costly, both time-consuming and labor-intensive. To this end, the subject application provides devices that can optionally and independently comprise offline circuitry (e.g., processor) that can efficiently and effectively learn signal propagation by generating RSS matrices using, for example, one or more mobile sensor devices. Generally as described in the subject disclosure, mobile sensor devices can have transceiver (e.g., transmission and/or receive) functionalities, or can have access to, transceiver facilities or capabilities. The mobile sensor device can, for instance, emit (transmit) beacon signals and can receive beacon signals from one or more disparate neighboring mobile sensor device. The mobile sensor device can then transmit (e.g., broadcast) its current location in its transmitted beacon signal, as well as, transmit beacon information that it can have received from the one or more disparate neighboring mobile sensor devices to a server device.

It has been found that in instances server device locations can be uncertain. To understand this issue the following offline RSS matrix generation statement can be beneficial in resolving the issue: given noisy estimated server device locations and RSS data received over time from mobile sensor devices, how can one construct a complete RSS matrix efficiently? The subject application resolves these issues by leveraging the movement and cooperation of mobile sensor devices using, for example, a Rao-Blackwellized particle filter, a framework that has had wide use in simultaneous localization and mapping (SLAM) applications. Thus, in accordance with use of a Rao-Blackwellized partical filter, in each defined or definable time period, the sensor device locations can be refined based on one or more signal measurement and/or use of one or more current RSS matrices. Once sensor device locations have been refined, and based on the refined location data, the RSS matrix can be updated.

The subject disclosure applies a fine-grained model-free approach to the mobile sensor tracking issue. The subject application, during extensive testing and experimentation in a university campus and a shopping mall, has achieved tracking errors of approximately 4.37 meters (m) and 9.46 m respectively, which it is noted significantly outperforms other approaches.

Illustrated in FIG. 1 is an example system 100 in accordacne with various embodiments. System 100 can include sensor devices 102 and target devices 104 located in a defined area (e.g., venue, such as a university campus, shopping mall, warehouse, hospital, airport, . . . ). As depicted, the venue is a partial view of a portion of the defined area. The partial view of the defined area can include a partitioned areas, wherein partitions are illustrated as grey solid lines. As illustrated, sensor devices 102 can have been dispersed thoughout the defined area and similarly, target devices 104 can also be dispersed within the defined area. The dotted lines variously extending between the sensor devices 102 and/or target devices 104 can represent beaconing signal transmissions that can be occuring between the various devices (e.g., sensor devices 102 and/or target devices 104).

In accordance with FIG. 1, sensor devices 102 can listen for beacon signaling from its respective neighboring target devices 104 (e.g., nodes within a defined sensing range value of one or more respective sensor devices 102). In response to receiving the beacons, sensor devices 102 can forward the received beacons to a server device of a group of server devices (not shown) together with their respective location to the receiving sensor device 102. Target devices 104 can periodically broadcast beacon signals. Beacon signals can comprise at least the respective broadcasting target device's 104 own unique identifier, a remaining lifetime value (typically initialized to a hop limit value), and the measured RSS of neighboring target devices 104. Meanwhile, target devices 104 can also rebroadcast beacons from respective other target devices 104 within a defined hop limit away. Typically, the hop limit value (e.g., maximum beacon lifetime value) balances the sensing coverage and rebroadcast overhead of target devices 104.

Figure 2A:
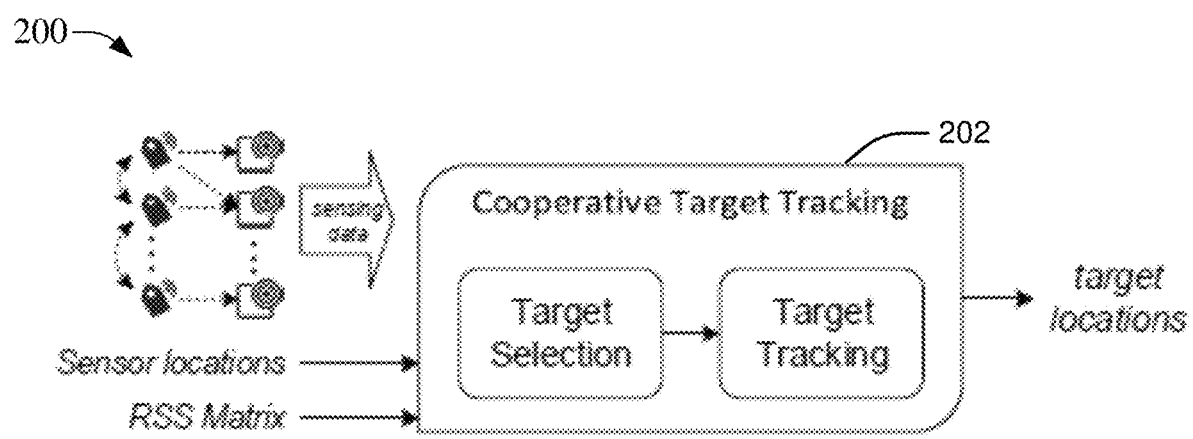
FIGS. 2A and 2B are further depictions of a system for cooperative target tracking and signal propagation learning using mobile sensors, in accordance with aspects of the subject disclosure.
Figure 2B:
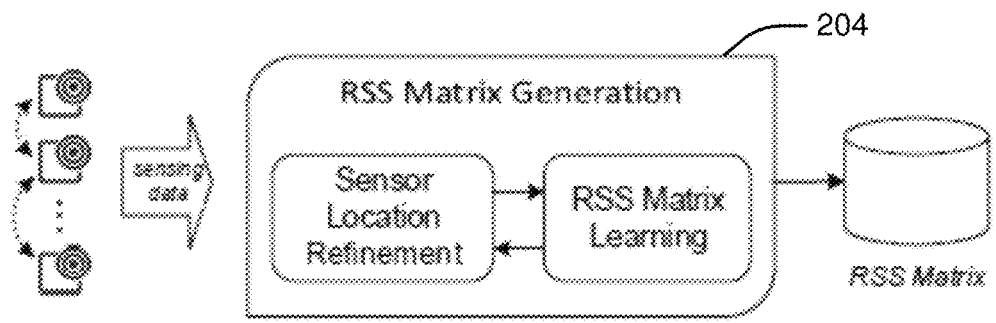

FIG. 2A and FIG. 2B depict two aspects 200 of the subject disclosure for facilitating cooperative target device tracking and signal propagation learning using mobile sensor devices. FIG. 2A illustrates a workflow for cooperative target tracking module 202 in accordane with embodiments set forth in the subject disclosure. Each sensor device 102 can report the beacons that it has received (e.g., from other devices within its broadcast/reception purview (sensor devices 102 and target devices 104)) as well each sensor device's 102 own respective location data. Additionally and/or alternatively, RSS matrices representing the spatial signal propagation of the site or venue can also be imported or input to cooperative target tracking module 202. Based on the received data, the cooperative target tracking module module 202 illustrated in FIG. 2A can use a modified particle filter to estimate target device 104 locations. For each iteration, target devices 104 can be localized sequentially. Specifically, to localize a next target device 104 to be estimated, cooperative target tracking module 202 performs target device 104 selection based on a determined number of neighboring target devices 104. Cooperative target tracking module 202 can localize a target device 104 with the highest (e.g., ranked) confidence level every time. Later, for tracking target devices 104, particles can be updated based on a motion model(s) and a spatial relation each target device 104 selection based on a determined number of neighboring target devices 104. Cooperative target tracking module 202 can localize a target device 104 with the highest (e.g., ranked) confidence level every time. Later, for tracking target devices 104, particles can be updated based on a motion model(s) and a spatial relation each target device 104 has with its neighboring devices (e.g., sensor devices 102 and/or target device 104). At the completion of an iteration, cooperative target tracking module 202 can generate (output) estimated locations for all the target devices 104.

With regard to FIG. 2B RSS matrix generation module 204 is designed to apply a Rao-Blackwellized particle filter (RBPF) framework. The RSS matrix generation process can operate in an iterative manner. Within each iteration, particles can be predicted and updated based on sensor device 102 mobility as well as respective sensor device 102 estimated locations. Using a mutual RSS measurement value, the RSS matrix generation module 204 constrain possible locations of each sensor device. According to refined sensor device 102 locations, the RSS matrix is updated over time.

Figure 3:
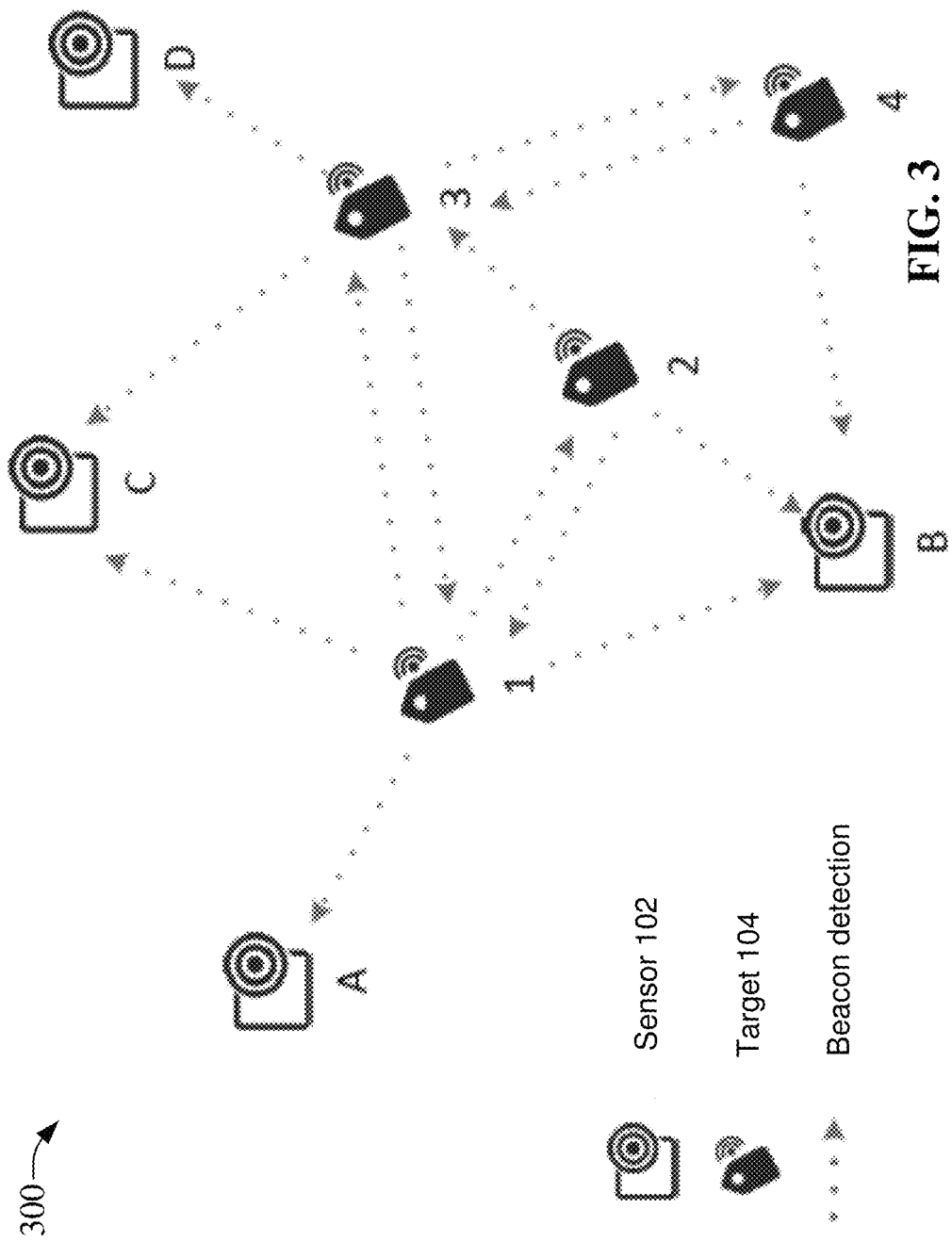
FIG. 3 provides depiction of example system for cooperative target tracking and signal propagation learning using mobile sensors, in accordance with aspects of the subject disclosure.

FIG. 3 depicts an example cooperative target tracking system 300 using the facilities and functionalities disclosed in the subject application and in accordance with embodiments set forth herein. FIG. 3 provides illustration of how the disclosed tracking process operates. As depicted and solely for purposes of exposition, a sensor network can comprise 4 sensor devices (e.g., sensor devices 102) and/or 4 target devices (e.g., target devices 104). During defined time period from t−1 to t, target devices can broadcast beacons asynchronously. Dashed arrows indicate the reception of beacons at sensor devices and/or target devices. To determine target device locations at time t jointly, the process orders, sorts or ranks target devices as a function of the number of covered sensor devices. As illustrated, the sorted/ranked/ordered target listing, in this instance, would be {1,3,2,4}. Then, the process locates target devices based on the sorted ordered/ranked/sorted listing. The process first determines a posterior probability $p(x_t^1|o_{1:t})$ and determines the location of target device 1. It will be observed that the position of target device 1, in this example, can be identified without additonal information of other target devices as there are 3 sensor devices providing sensing data with regard to beacon signals that can have been received (e.g., by sensor devices A, B, and C) from target 1. Thereafter, the process can determines locations for target devices 3, 2 and 4, respectively. It will be observed that when determining the location of target device 2, since determined locations for target 1 and target 3 have already been determined, the process can use the locations of target device 1 and target device 3 to determine a location of target device 2. It will be noted however, where the process determines a location of target device 2 first, sensing data from sensor device B has to be relied on to make an estimation as to the location of target device 2. It will be observed from the foregoing illustrative example, that by depending on locations that can have been previously determined, the disclosed systems and methods have the potential to improve target device location accuracy.

Figure 4:
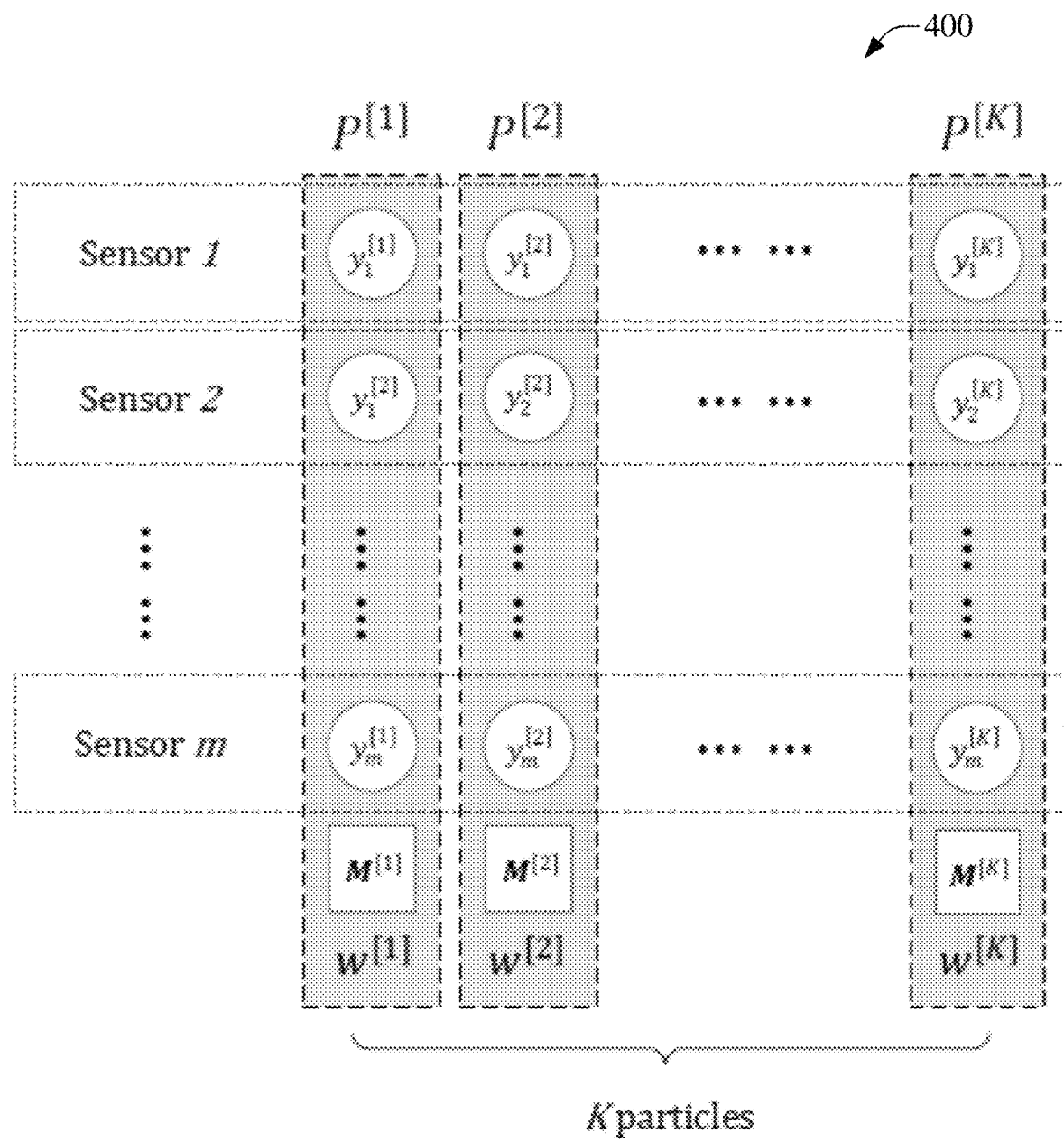
FIG. 4 provides illustration of particles structure for cooperative target tracking and signal propagation learning using mobile sensors, in accordance with aspects of the subject disclosure.

FIG. 4 provides illustration of particles as applied in RBPF, in accordance with some disclosed embodiments. A gray column can represent individual particles (e.g., $P^{[1]}$, $P^{[2]}$, . . . . $P^{[K]}$), wherein each particle P can comprise a grouping of sensor device location values (y), an estimation of RSS matrix (M), and associated weight values (w).

An RSS matrix generally captures signal propagation information in a venue (e.g., hospital, shopping mall, college campus, and the like). In order to construct an RSS matrix, the venue is discretized. Specifically, grouping of seed points can be scattered or dispersed in accessible regions of the venue. Thereafter Voronoi diagrams can be generated. Each polygonal partition of the Voronoi diagram can be referred to as a cell. In accordance with the characteristics of Voronoi diagrams since any point inside the cell can be closer to the corresponding seed point than other points, a cell can be identified where a point locates by searching its nearest seed point in the plain.

Thus, a venue can be partitioned into c cells, a c×c RSS matrix M can be generated, wherein every cell can be labeled with an index. RSS measurements can often be assumed as having Gaussian noise. $M_{i,j} = \langle \mu_{M_{i,j}}, \sigma_{M_{i,j}} \rangle$ can be stored to represent a RSS distribution, where $\mu_{M_{i,j}}$ and $\sigma_{M_{i,j}}$ are the mean and standard deviation of signal strength emitted/broadcast from an i-th cell and received at a j-th cell.

One issue in generating RSS matrices is the so-called device heterogeneity problem issue. Because different sensor devices and target devices can have different transmission power values and antenna gain values, offset values among these devices can distort tracking accuracy. To overcome this issue, the disclosed systems and/or methods select or identify a specific device as a reference device, and measurements for other devices are thereafter adjusted with respect to levels in the context of the reference device. More specifically, for every device, RSS values can be measured at a same distance (e.g., 1 meter) and offset values determined with in relation to measurements associated with the reference device. As a function a listing of offset values and RSS values from known (identified or identifible) devices, a linear transformation can be performed to adjust RSS values in relation to the reference device.

In relation to the facilities and/or functionalities of cooperative target tracking module 202 (see FIG. 2), cooperative target tracking in general can be modeled as estimating the true states of a dynamic system from noisy observations. At discrete time t, the locations of target devices (e.g., target device 104) can be represented by system state $x_t = \{x_t^1, x_t^2, \ldots, x_t^n\}$, where $x_t^i = \{x\text{-coordinate}, y\text{-coordinate}\}$ can be the 2-D coordinate of target i. Similarly, the location of sensor devices (e.g., sensor device 102) can be denoted as $y_t=\{y_t^1, y_t^2, \ldots, y_t^m\}$. During the defined time periof from t−1 to t, target devices can be assumed to move according to a given motion model $p(x_t^i|x_{t-1}^i)$, a probability density function of target i's current location given its previous location $x_{t-1}^i$.

To leverage temporal information, sensing data from time 1 to time t (denoted as $\{o_{1:t}, z_{1:t}\}$) and the motion model can be used to estimate target device locations at time t. A sequential importance resampling (SIR) particle filter, can for example, be used to incorporate temporal sensing data for location estimation. The posterior probability distribution of target device locations at time t−1 can be determined by $p(x_{t-1}|o_{1:z-1}, z_{1:t-1})$. An observation model $p(o_t, z_t|x_t)$ can describe a likelihood of observing sensing result $\{o_t, z_t\}$ based on target device locations $x_t$. As interest is had in determining the joint posterior probability distribution of target device locations, e.g., $p(x_t|o_{1:t}, z_{1:t})$, a particle filter can determine the posterior distribution recursively according to:

$$p(x_t \mid o_{1:t}, z_{1:t}) \propto \underbrace{p(o_t, z_t \mid x_t)}_{\text{likelihood}} \int p(x_t \mid x_{t-1}) \underbrace{p(x_{t-1} \mid o_{1:t-1}, z_{1:t-1})}_{\text{posterior of previous location}} dx_{t-1}. \quad (1)$$

However, since target devices are able to sense with each other, leveraging mutual sensing data to estimate the joint posterior probability $p(x_t|o_{1:t}, z_{1:t})$ can incur unaffordable time complexities. To address this, cooperative target tracking module 202 devises a modified particle filter to approximate the individual conditional posterior probabilities for target device location sequentially instead of considering them together at the same time.

A sensor device can be associated with a target device if the sensor device receives a beacon from the target device. Thus, cooperative target tracking module 202 orders, ranks, and/or sorts target devices based on a localization confidence value that can be determined as the number of sensor devices associated with the target device. Then for each target device, cooperative target tracking module 202 determine a conditional posterior distribution, and hence a location for each target device. By doing so, target device locations that can be determined with a high degree confidence can appear at the top of a ranked list of target devices, and based at least in part on the higher ranked target device locations, locations of other target devices can be determined.

For purposes of cooperative target tracking module 202, the joint posterior distribution of target device locations $p(x_t^1, \ldots, x_t^n|o_{1:t}, z_{1:t})$ at time instance t can be represented by a set of particles, which can be denoted as $P_t = \cup_{i \in D} P_t^i$, where $P_t^i = \{P_t^{i,[1]}, \ldots, P_t^{i,[K]}\}$ is the set of particles representing target device i's location and $P_t^{i,[k]}$ can be the k-th particle of target device i. The location distribution of each target device can be represented by K particles. K can be a system parameter which balances the computational complexity and the tracking accuracy. Each particle can be formed by a tuple $\langle x_t^{i,[k]}, w_t^{i,[k]} \rangle$, where $x_t^{i,[k]}$ is a possible location of target device i and weight $w_t^{i,[k]}$ represents how likely the true target device location is $x_t^{i,[k]}$. In each iteration, the tracking can be separated into two successive steps: target device selection and target device tracking, as detailed as follows.

Typically, the number of sensor devices within a broadcast coverage area of a target device can be different. Intuitively, the larger the number of sensor devices within the coverage area a target device, the more accurate an estimate can with regard to the location of the target device. Therefore, cooperative target tracking module 202 sort/ranks/orders targets as a function of a determined number of sensor devices within the broadcast coverage area of the sensor devices (ties can be broken arbitrarily). With the ordered, ranked or sorted listing of target devicess, a joint posterior probability can be determined as:

$$p(x_t^1, \ldots, x_t^n \mid o_{1:t}, z_{1:t}) \approx p(x_t^1 \mid o_{1:t}, z_{1:t-1}) p(x_t^2 \mid o_{1:t}, z_{1:t-1}, x_t^1, z_t^1) \quad (2)$$

$$\ldots \underbrace{p(x_t^n \mid o_{1:t}, z_{1:t-1}, x_t^1, \ldots, x_t^{n-1}, z_t^1, \ldots, z_t^{n-1})}_{\text{conditional posterior of target } i},$$

where $p(x_t^i|o_{1:t-1}, x_t^1, \ldots, x_t^{i-1}, \ldots, z_t^{i-1})$ is an approximated conditional posterior distribution of target device i. Initially, it can be observed that the computation of posterior distribution of the location of target device 1 (e.g., as depicted in FIG. 3) can be approximated by $p(x_t^1|o_{1:t}, z_{1:t-1})$ which does not depend on sensing data with regard to other target devices at the current time instance. While the computation of posterior probability of target device 2 can be determined by $p(x_t^2|o_{1:t}, z_{1:t-1}, x_t^1, z_t^1)$, which can be dependent on sensing data with regard to target device 1 and location data with respect to target device 1. Since cooperative target tracking module 202 does not generally know the exact location of target device 1, cooperative target tracking module 202 can use an estimated location instead. Target device locations can be estimated based on the ranked order or sorted order of target devices one by one, in a sense determination of later listed target devices are able to make use of the estimated locations and sensing data of previously estimated target devices.

Cooperative target tracking module 202 can use a prediction step/act in the particle filter process. The location distribution of the i-th target device at time instance t−1 can be represented by particles $\{P_t^{i,[1]}, \ldots, P_t^{i,[K]}\}$. At time 0, particles can be uniformly distributed in the whole accessible area (e.g., venue) as cooperative target tracking module 202 generally does not have any prior knowledge of target device locations and a target device can be at any location within the venue. Typically, cooperative target tracking module 202 is unaware of a moving speed and direction of the target device. Nevertheless, cooperative target tracking module 202 can be aware of a target device's moving distance within time interval must be less than a defined value $d_{max}$. Thus, when target device i is at location $x_{t-1}$ at a last time instance, at time t, the target device could be at any location within a circular region with origin $x_{t-1}$ and radius $d_{max}$. More precisely, the motion model can be given by the following probability density function:

$$p(x_t \mid x_{t-1}) = \begin{cases} \dfrac{1}{\pi d_{max}^2}, & \text{if the Euclidean distance between } x_{t-1} \text{ and} \\ & x_t \text{ is not greater than } d_{max}, \\ 0, & \text{otherwise.} \end{cases} \quad (3)$$

To predict the next location of target device i, cooperative target tracking module 202 moves each of the particles of target device i to a random position within in the circular region with radius $d_{max}$ centered at the particle. That is, for each particle $P_{t-1}^{i,[k]} = \langle x_{t-1}^{i,[k]}, w_{t-1}^{i,[k]} \rangle$:

$$P_{t-1}^{i,[k]} \xrightarrow{motion\ model} P_t^{i,[k]} = \langle x_t^{i,[k]}, x_{t-1}^{i,[k]} \rangle, \quad (4)$$

where $x_t^{i,[k]}$ is the new particle's location.

The weight of each particle can be updated by cooperative target tracking module 202 according to the foregoing observations. Note that before estimating the posterior distribution of target device i, cooperative target tracking module 202 can have already determined the locations of target devices {0, 1, . . . , i–1}. Cooperative target tracking module 202 given sensing data $o_{1:t}$ at sensor devices, the sensing data at target device {0, 1, . . . , i–1} and the estimated location of target device {0, 1, . . . , i–1}, cooperative target tracking module 202 is able to measure a likelihood of each particle $P_t^{i,[k]}$ being at the true location. Recall that the signal propagation loss between any two points in the map can be given by the RSS matrix M. Denote x and y as the locations of a target device and a sensor device, respectively, and o can be the detected RSS at the sensor device. Then the likelihood of RSS measurement p(o|x,y) follows $N(\mu_{M_{\zeta,\eta}}, \sigma_{M_{\zeta,\eta}}^2)$, where $\zeta$ and $\eta$ are the cell indexes of x and y, respectively. Considering that the RSS observed at each sensor device/target device is independent, the likelihood of observing sensing result $\{o_t, z_t^1, \ldots, z_t^{i-1}\}$ can be determined as:

$$p(o_t, z_t^1, \ldots, z_t^{i-1} \mid x_t^i, x_t^1, \ldots, x_t^{i-1}, y_t) = \quad (5)$$

$$\prod_{j \in C} p(o_t^j \mid x_t^i, y_t^j) \prod_{j=0}^{i-1} p(z_t^j \mid x_t^i, x_t^j),$$

where $p(o_t^j \mid x_t^i, y_t^j)$ is the likelihood that the RSS of target device i's beacon received at sensor devuce j is $o_t^j$, and, similarly, $p(z_t^j \mid x_t^i, x_t^j)$ is the likelihood that the RSS of target device i's beacon received at another target device J is $z_t^j$. Note that the likelihood of target device i being at location $x_t^i$ depends on sensing data at all sensor devices and data at target devices whose locations are already estimated.

Cooperative target tracking module 202 can update the weight of each particle of target device i according to $p(o_t, z_t^1, \ldots, x_t^1, \ldots, x^{i-1}, y_t)$. That is, for each $P_t^{i,[k]}$, $\langle w_{t-1}^{i,[k]} \rangle$, $$P_t^{i,[k]} \xrightarrow{update} \langle x_t^{i,[k]}, w_t^{i,[k]} \rangle, \text{ where} \quad (6)$$

$$w_t^{i,[k]} \propto p(o_t, z_t^1, \ldots, z_t^{i-1} \mid x_t^{i,[k]}, x_t^1, \ldots, x_t^{i-1}, y_t).$$

Then, the weight of particles can be normalized by cooperative target tracking module 202 to satisfy $\Sigma_k w_t^{j,[k]} = 1$.

The location of target device i at time t can be estimated by cooperative target tracking module 202 by using the expectation:

$$\hat{x}_t^i = \sum_k x_t^{i,[k]} w_t^{i,[k]}. \quad (7)$$

The expectation can be used by cooperative target tracking module 202 to address the degeneracy issue of the SIR particle filter. The basic idea of resampling by cooperative target tracking module 202 is to eliminate trajectories that have small normalized importance weights and to concentrate upon trajectories with large weights. Resampling can be perfomed by cooperative target tracking module 202 as follows: 1) draw K particle samples from all particles, each of the K particle being drawn with a probability as its weight; 2) replace $P_t^i$ with the drawn particles, and s) set the weight of each particle to be 1/K.

FIG. 5 illustrates an algorithm or process 500 that can be used by RSS matrix generation module 204 to efficiently generate RSS matrices in accordance with some disclosed embodiments of the subject application. In accordance with various embodiments, RSS matrix generation module 204 can generate RSS matrices under noisy sensor device locations efficiently. The output RSS matrices can be used as input for more accurate cooperative tracking.

In order to generate RSS matrices, there can be a requirement for accurate sensor device locations. However, sensor device locations can usually be noisy in reality, and RSS matrices can aid in reducing such errors to some extent. To solve this chicken-or-egg problem, RSS matrix generation module 204 estimates a joint posterior $$p(y_{0:t}, M \mid s_{1:t}, \psi_{1:t}), \quad (8)$$

where $y_{0:t}$ is a sequence of sensor device locations from time 0 to t, M is a RSS matrix, $s_{1:t}$ is a sequence of mutual measurements among sensor devices, and $\psi_{1:t}$ is a sequence of noisy location estimations of sensor devices provided by external sources.

To take the advantage of temporal and spatial information, Monte Carlo filtering approaches can be employed by RSS matrix generation module 204 to address this issue. However, these approaches generally cannot estimate equation (8) efficiently as the existence of the RSS matrix in the posterior probability increases the dimensionality of the estimation space. Nevertheless, equation 8 can be factorized as $$p(y_{0:t}, M \mid s_{1:t}, \psi_{1:t}) = p(y_{0:t} \mid s_{1:t}, \psi_{1:t}) \, p(M \mid y_{0:t}, s_{1:t}, \psi_{1:t}) = \quad (9)$$

$$\underbrace{p(y_{0:t} \mid s_{1:t}, \psi_{1:t})}_{\text{sensor trajectiory posterior}} \underbrace{p(M \mid y_{0:t}, s_{1:t})}_{\text{RSS matrix posterior}}.$$

The factorization can decompose the joint posterior estimation into two separate problems, e.g., (i) sensor device trajectory estimation, and (ii) RSS matrix estimation based on sensor device locations. In realization of this aim, RSS matrix generation module 204 can employ a modified RBPF.

RSS matrix generation module 204 thus determines the sensor trajectory posterior probability $p(y_{0:t} \mid s_{1:t}, \psi_{1:t})$ in equation (9). Further, RSS matrix generation module 204 factorizes the posterior probability as:

$$p(y_{0:t} \mid s_{1:t}, \psi_{1:t}) \propto p(s_t, \psi_t \mid y_t) \, p(y_{0:t} \mid s_{1:t-1}, \psi_{1:t-1}) = \quad (10)$$

$$p(y_{0:t} \mid s_{1:t-1}, \psi_{1:t-1}) \, p(\psi_t \mid y_t) \, p(s_t \mid y_t),$$

where $p(y_{0:t} \mid s_{0:t-1}, \psi_{0:t-1})$ is a prediction of current sensor device trajectory based on historical information, $p(\psi_t \mid y_t)$ is a likelihood of estimated sensor device locations, and $p(s_t \mid y_t)$ is a likelihood of mutual sensing. Hence RSS matrix generation module 204 can draw samples from a motion model first, and then update weights according to the two types of likelihood as determined above (e.g., $p(\psi_t|y_t)$—likelihood of estimated sensor device locations, and $p(s_t|y_t)$—likelihood of mutual sensing).

Since sensor device estimation based on external approach can be independent from each other, we have $p(\psi_t|y_y)=\Pi_{j=1}^m p(\psi_t^j|y_t^j)$. By use of a central limit theorem, RSS matrix generation module 204 can further assume the estimated sensor device location follows a zero-mean multivariate Gaussian distribution, e.g., $p(\psi_t^j|y_t^j)$: $N(y_t^j,\Sigma_{sj})$, where j represents the sensor device index, and the covariance matrix $\Sigma_{sj}$ of sensor device location can be a diagonal matrix whose elements on the main diagonal is equal to $\sigma_s^2$. The value of $\sigma_s$ can relate to the choice of external sensor localization techniques and its accuracy.

Each particle can represent a combination of the potential locations of all the sensor devices. Thus every particle can contain m locations for m sensor devices. As the RSS matrix is unknown, each particle can also include a local RSS matrix following the RBPF. Determination of the RSS matrix is discussed later. $P_t^{[k]}$ can be denoted as the k-th particle at time t, which results in $P_t^{[k]}=\langle y_t^{[k]}, M_t^{[k]}, w_t^{[k]}\rangle$, where $y_t^{[k]}$ represents a "guess" in regard to a sensor device location(s) in the particle, $M_t^{[k]}$ denotes the local RSS matrix estimated in the particle, and $w_t^{[k]}$ is a determined and assigned weight of the particle.

In the prediction stage, RSS matrix generation module 204 can predict a particle's state as a function of a previous estimation. Considering that the mobility of each sensor device can independent, RSS matrix generation module 204 can predict particle states by predicting each sensor device location individually. Here RSS matrix generation module 204 can use the same motion model as set forth in equation 3 above.

In the updating stage, RSS matrix generation module 204 can update the weight $w_t^{[k]}$ of each particle. The weight can represent a belief on each particle. Higher weights indicate that the paricle is more likely to be chosen. To determine $w_t^{[k]}$, RSS matrix generation module 204 can derive it as follows:

$$w_t^{[k]} \propto \frac{p(y_{0:t}^{[k]} | s_{1:t}, \psi_{1:t})}{p(y_{0:t}^{[k]} | s_{1:t-1}, \psi_{1:t-1})} \propto \quad (11)$$

$$\frac{p(s_t, \psi_t | y_{0:t}^{[k]}, s_{1:t-1}, \psi_{1:t-1}) \, p(y_{0:t}^{[k]} | s_{1:t-1}, \psi_{1:t-1})}{p(y_{0:t}^{[k]} | s_{1:t-1}, \psi_{1:t-1})} =$$

$$p(s_t, \psi_t | y_{0:t}^{[k]}, s_{1:t-1}, \psi_{1:t-1}) = p(\psi_t | y_t^{[k]}) \, p(s_t | y_{0:t}^{[k]}, s_{1:t-1}).$$

With regard to equation 11 the first term follows the sensor device location observation model. To further determine the second term $p(s_t|y_{0:t}^{[k]},s_{1:t-1})$, RSS matrix generation module 204 performs the following:

$$p(s_t|y_{0:t}^{[k]},s_{1:t-1})=\int p(s_t,M|y_{0:t}^{[k]},s_{1:t-1})dM=\int p(s_t| M,y_{0:t}^{[k]})p(M|y_{0:t-1}^{[k]},s_{1:t-1})dM. \quad (12)$$

Equation 12 can be approximated by RSS matrix generation module 204 as Gaussian density:

$$p(s_t | y_{0:t}^{[k]}, s_{1:t-1}) \propto \prod_{s_t^{i,j} \in s_t} \exp\left(-\frac{(s_t^{i,j} - \hat{s}_t^{i,j})^2}{2\phi_{i,j}^2}\right), \quad (13)$$

where $s_t^{i,j}$ represents the RSS measurement by the device in i-th cell and received in j-th cell, and $\hat{s}_t^{i,j}$ represents the expected RSS measurement, e.g., $\hat{s}_t^{i,j}=\mu_{M_{i,j}}$. The variance $\phi_{i,j}^2$ in equation 13 can represent the uncertainty on estimation, which can be determined as the summation of the variance of $p(s_t^{i,j}|M_{i,j},y_{0:t}^{[k]})$ and the variance $p(M_{i,j}|y_{0:t-1}^{[k]},s_{1:t-1})$. It will be observed that $p(s_t|y_t^{[k]},s_{1:t-1})$ actually indicates how likely the particle matches to the current RSS matrix estimation. Note that the weight of particles should be normalized to satisfy $\Sigma_{jk} w_t^{j,[k]}=1$.

Based on the updated weight of each particle, RSS matrix generation module 204 can determine the i-th sensor device location $\hat{y}_t^i$ by determining an expectation of sensor device location, as:

$$\hat{y}_t^i = \sum_k w_t^{[k]} y_t^{i,[k]}. \quad (14)$$

Under the framework of RBPF, RSS matrix generation module 204 can determine the RSS matrix at the same time as refining the sensor device locations. The determination by RSS matrix generation module 204 can be conducted by recursively updating the posterior probability of RSS matrix $p(M|y_{0:t},s_{1:t})$.

For any element $M_{i,j}$ in the RSS Matrix M, if there is a measurement at time t where the transmitting sensor device is located in $l_1$ and the receiver sensor device is located at $l_j$, then element $M_{i,j}$ needs to be updated. In this instance, $M_t^{i,j}$ can be used to represent the element with coordinate (i,j) in the RSS matrix M of time t. For the simplicity of the symbol, let $M_t^{i,j}$:$N(\mu_t,\sigma_t^2)$, and $s_t$ represent the RSS measurement for $M_{i,j}$ at time t. As $p(\mu_t|s_{1:t}) \propto p(s_t|\mu_t) \, p(\mu_t|s_{1:t-1})$ where both the prior $p(\mu_t|s_{1:t-1})$ and the likelihood function $p(s_t|\mu_t)$ are Gaussian variables, the posterior probability $p(\mu_t|s_{1:t})$ can be updated, by RSS matrix generation module 204, as Gaussian with $$\mu_t = \frac{1}{B}\left(\frac{\mu_{t-1}}{\sigma_{t-1}^2} + \frac{s_t}{\sigma^2}\right), \text{ and } \sigma_t^2 = \frac{1}{B}, \quad (15)$$

where $B=1/\sigma_{t-1}^2+1/\sigma^2$ and $\sigma^2$ is the measurement variance. On the other hand, if the matrix element does not need to be updated, RSS matrix generation module 204 can simply leave it unchanged:

$$p(\mu_t|s_{1:t})=p(\mu_{t-1}|s_{1:t-1}) \quad (16)$$

In order to yield the RSS matrix, RSS matrix generation module 204 can take the weighted average as the approximation (for simplicity of exposition the subscript t for has been omitted):

$$M_{i,j} = \sum_k w_t^{[k]} M_{i,j}^{[k]}. \quad (17)$$

In regard to the foregoing cooperative target tracking module 202 and RSS matrix generation module 204 these modules can be in operative communication with one or more processor devices, memory devices, and/or storage devices (not shown). Typically, the one or more processor devices, memory devices, and/or storage devices can be included in a system, device, and/or apparatus. In accordance with various embodiments, cooperative target tracking module 202 and/or RSS matrix generation module 204 can be in communication with the one or more processor devices to facilitate operation of computer-executable instructions or machine-executable instructions and/or components by cooperative target tracking module 202 and/or RSS matrix generation module 204, the one or more memory devices for storing data and/or computer-executable instructions or machine-executable instructions and/or components, and one or more storage devices for providing longer term storage of data and/or machine-readable instructions and/or computer-readable instructions. Additionally, the system, device, and/or apparatus that can include cooperative target tracking module 202 and/or RSS matrix generation module 204 can also receive input for use, manipulation, and/or transformation by cooperative target tracking module 202 and/or RSS matrix generation module 204 to produce one or more useful, concrete, and tangible results, and/or transform one or more articles to different states or things. Further, the system, device, and/or apparatus that can include cooperative target tracking module 202 and/or RSS matrix generation module 204 can also generate and output the useful, concrete, and tangible results and/or the transformed one or more articles as output.

Illustrative examples of systems, devices, and/or apparatuses that can effectuate the functionalities and/or facilities associated with cooperative target tracking module 202 and/or RSS matrix generation module 204 can include any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise systems, devices, and/or apparatuses on which cooperative target tracking module 202 and/or RSS matrix generation module 204 can be operable can include tablet computing devices, handheld devices, server class computing devices, machines, and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, consumer and/or industrial appliances and/or instrumentation associated with automotive vehicles, industrial and/or consumer appliances and/or instrumentation associated with aerospace vehicles and/or satellites orbiting in low earth orbit, geosynchronous orbit, and the like.

FIG. 6 depicts illustrative results of testing of the disclosed and describe embodiments in the context of a college campus environment (venue) and a shopping mall venue. FIG. 6 shows the histograms of sensor device/target device coverage in both venues. Each distribution indicates the number of cases in which sensor devices/target devices are able to sense the target devices. Due to the limited area in the campus site (e.g., 28 m×70 m), it was observed that, in the most cases, 1-3 sensor devices (FIG. 6(a)) and 2-4 target devices (FIG. 6(b)) were able to capture beacon signals emanating from the target devices. However, the scenario in the shopping mall (130 m×180 m) proved more challenging. There was between approximately 11.4% (FIG. 6(c)) and about 14.4% (FIG. 6(d)) of all cases where no sensor device or other target device was able to detect a target device, respectively.

To illustrate the relation of tracking error and the number of devices in the coverage, we illustrate a period of data from a selected target device (e.g., target device 3) as an example. FIG. 7 visualizes the tracking error and the quantities of devices within the coverage umbra/penumbra of a particular target device. It will be observed from FIG. 7 that if many sensor devices or target devices are within the coverage umbra/penumbra, the tracking error is typically low. Nevertheless, there are two interesting observations can be identified from review of FIG. 7. There is no device in the coverage umbra/penumbra at all within the time range from 114 s to 120 s. As a result, the tracking error increases as the information about the target device is lost. In another time range from 145 s to 160 s, only limited number of sensor devices/target devices sense a particular target device, which is not sufficient to guarantee a good tracking accuracy in traditional approaches. However, since the disclosed application in accord with various embodiments, additionall considers mobilities of the devices, the facilities and/or functionalities set forth herein can still achieve satisfying performance.

Figure 8:
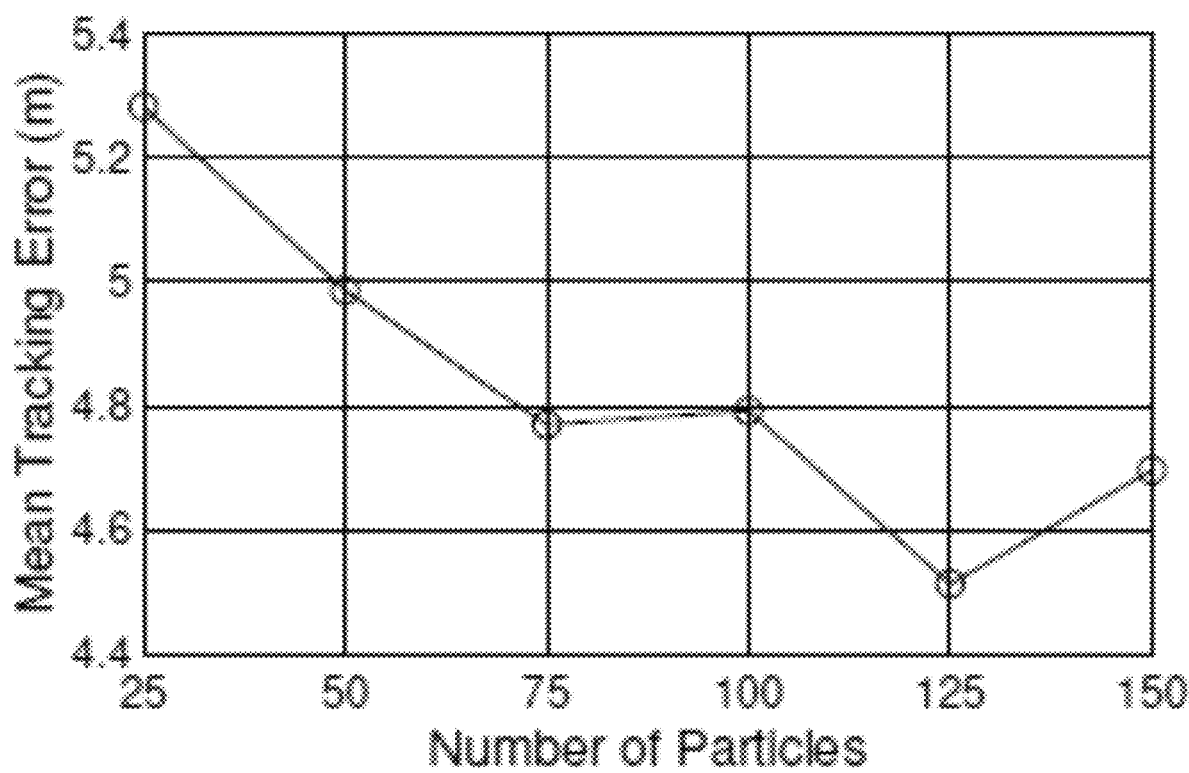
FIG. 8 provides illustration of a graph tracking errors versus the number of particles in an example campus setting, in accordance with described embodiments of the subject disclosure.
Figure 9:
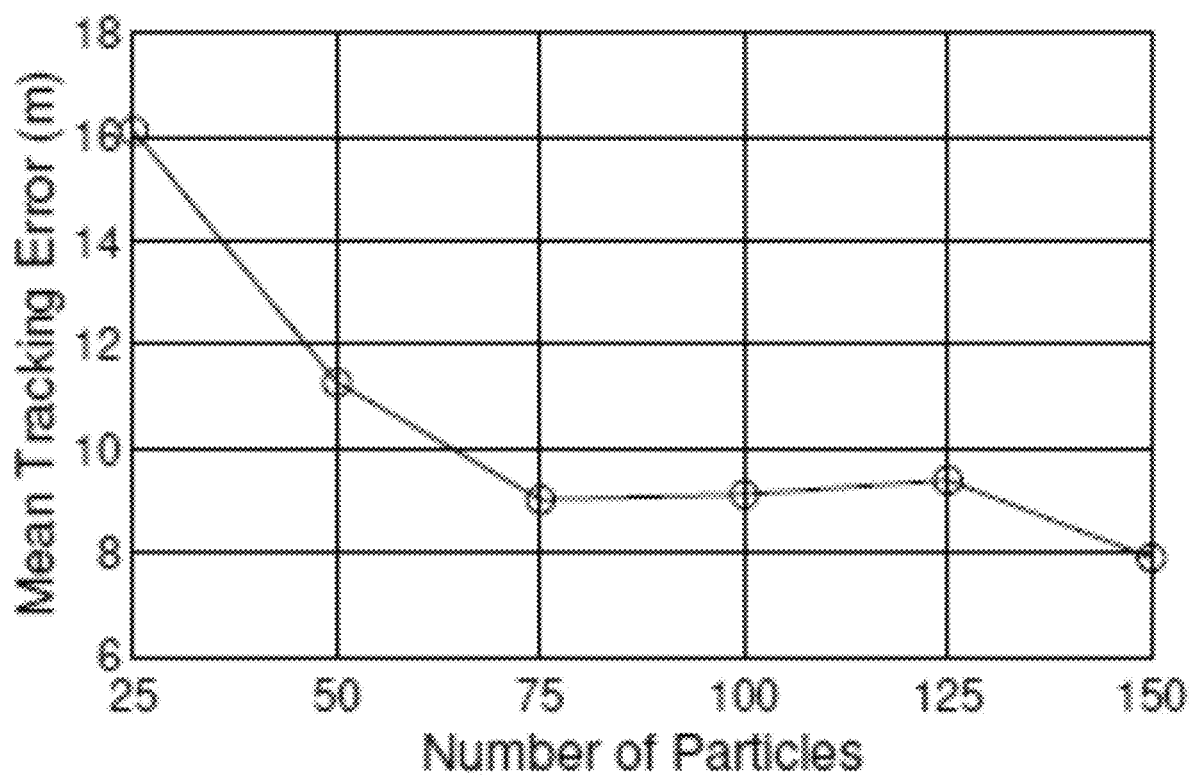
FIG. 9 provides illustration of a graph tracking errors versus the number of particle in an example shopping mall environment, in accordance with described embodiments of the subject disclosure.

FIGS. 8 and 9 show the impact of the number of particles against the tracking accuracy. As will be observed a large number of particles (usually more than 75) can bring significant improvement on tracking accuracy (over 10% and 40% in the campus environment and mall environment, respectively). The reason for this is that more particles can have a more accurate representation of the posterior probabilities of target device positions. However, when the amount of particles further increases, the improvement can be limited. This is because the subject disclosure uses a discrete representation on the signal propagation (e.g., the RSS matrix), and hence different particles can be located at the same cell with the same signal propagation information. On the other hand, a large number of particles can require more computational power and the cost can rise. To balance robustness and accuracy, it is suggest that approximately 125 particles be used when using the disclosed embodiments.

Figure 10:
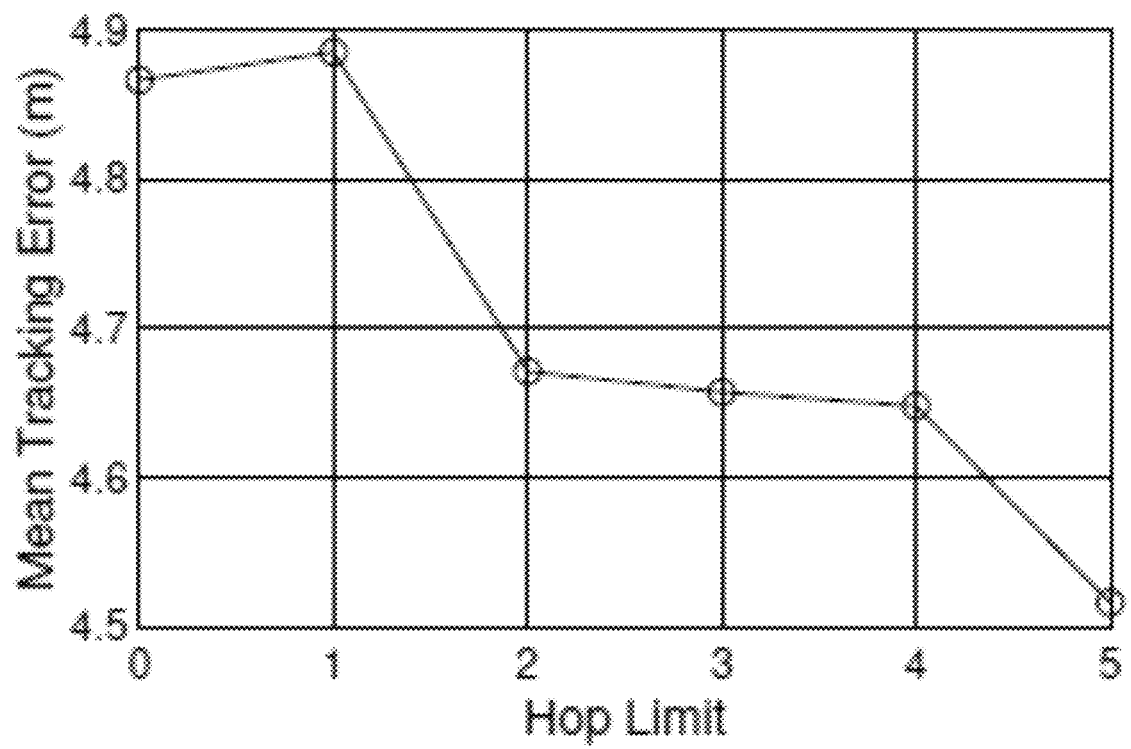
FIG. 10 provides illustration of a graph tracking errors versus a hop limit in an example college campus environment, in accordance with described embodiments of the subject disclosure.
Figure 11:
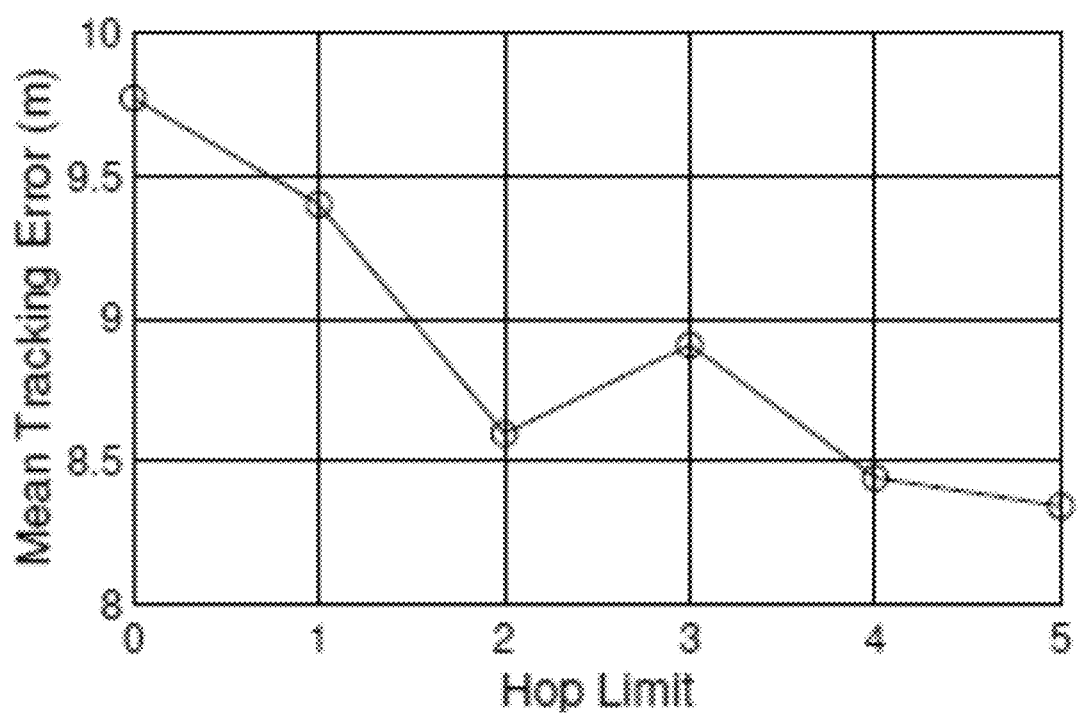
FIG. 11 provides illustration of a graph tracking errors versus a hop limit in an example shopping mall environment, in accordance with described embodiments of the subject disclosure.

In order to study the impact of hop limits on tracking accuracy, all sensing data within at most 5 hops were stored (e.g., to memory or longer term storage devices) and the hop counts labeled for each set of sensed data. The data could thus be filtered within desired hop limits to investigate its impact. FIGS. 10 and 11 show the tracking error versus hop limit in the campus setting and shopping mall setting, respectively. It was observed that, in the campu settings, increments of hop limit did not apparently improve system performance markedly, because the number of covered sensor devicess were adequate. In the mall site environment, by increasing the hop limit, a more comprehensive view on the collaborated relationship of target devices was provided. Hence, the error was reduced by more than 12% when hop limits were defined to be larger than 2 compared with no target device cooperation.

Figure 12:
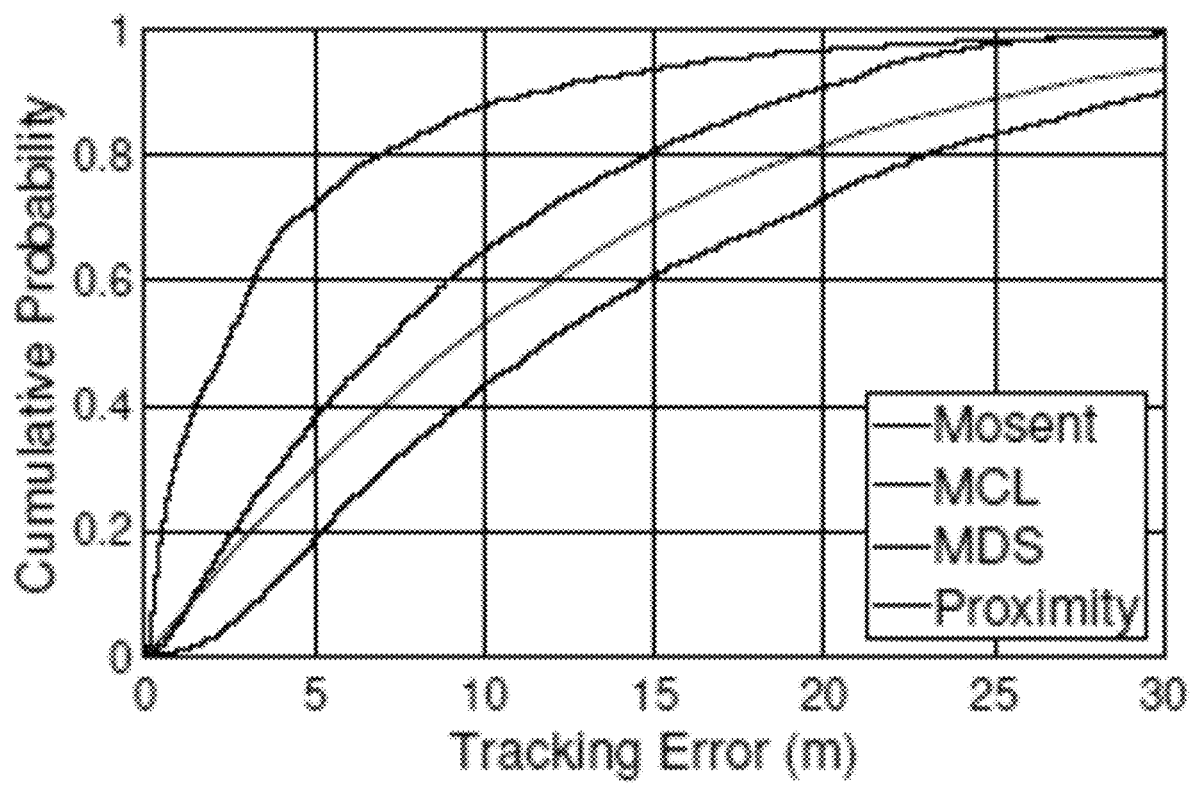
FIG. 12 provides illustration of a graph of CDF tracking errors under different location schemes in regard to the example college campus environment, in accordance with described embodiments of the subject disclosure.

FIG. 12 shows the CDF of tracking error of different processes in the scenario of the campus environment. In such complex indoor environments, the subject application (referred to in FIG. 12 as "Mosent") can outperform the state-of-the-art schemes by more than 40%. The mean error of for the subject application is 4.37. Both monte carlo localization (MCL) and MDS-based collaborative location (MDS) suffer from the unpredictable signal propagation characteristics. Hence, they cannot achieve satisfying results.

Figure 13:
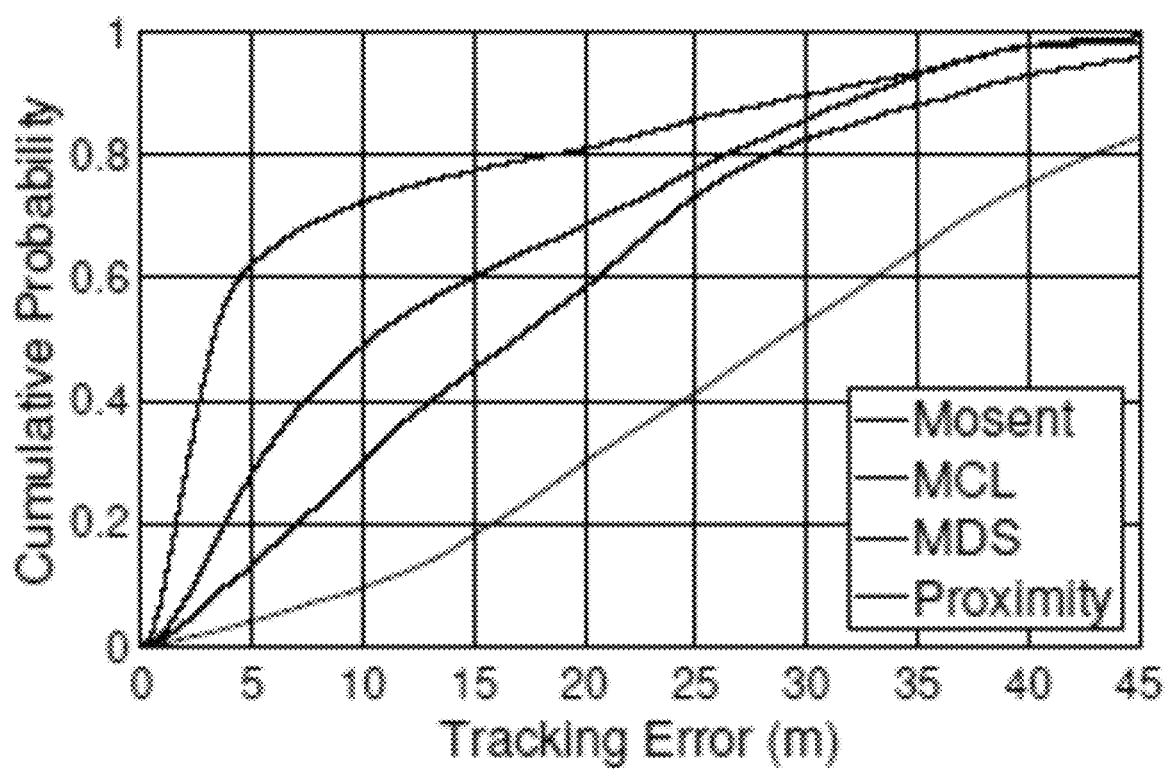
FIG. 13 provides illustration of a graph of CDF tracking errors under different location schemes in regard to the example college campus environment, in accordance with described embodiments of the subject disclosure.

FIG. 13 shows the overall comparison results in the shopping mall envronment, where tracking is rather challenging because of the huge area and low density of sensor devices/target devices. The performance of the subject application is still better than other systems. The mean error of the subject application is 9.46, and the 50th percentile is 3.27. It can be observed that a long error tail exists in the CDF. Such errors occur in instances when no device can sense the target device. On the other hand, MDS utilizes the shortest path distance to approximate the actual distance among devices. However, due to the extremely low sensor device/target device densities, such schemes fail to compute the accurate distance matrices. Hence it produces the highest error. Compared with other schemes, the subject application can still cut the error rate by about 30%.

Figure 14:
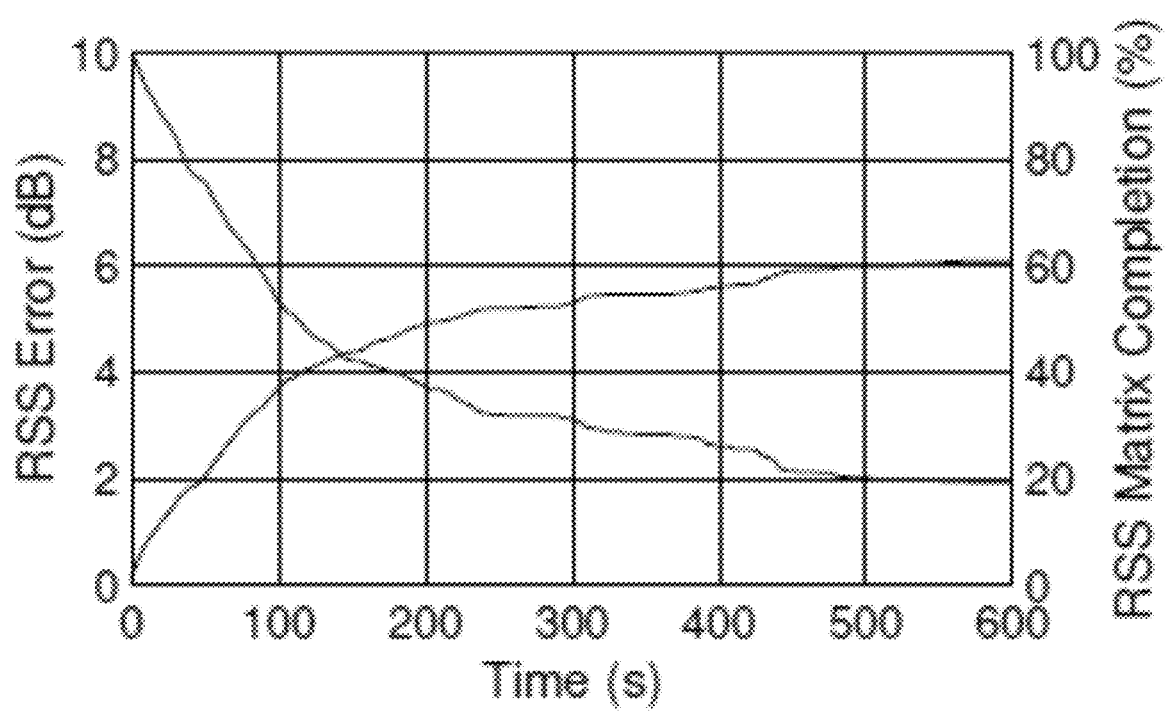
FIG. 14 provides illustration of a graph representing RSS errors and RSS matrix completion over time in regard to the example college campus environment, in accordance with described embodiments of the subject disclosure.

The RSS matrix generation performance can be investigate in terms of the RSS error and the RSS matrix completion percentage. FIG. 14 demonstrates the two metrics over time in the campus setting. It can be observed from FIG. 14 that the RSS matrix completion percentage keeps increasing and eventually converges at around 60%. The remaining entries cannot be learned because no detectable signal can transmit from one side and received at the other. Meanwhile, the mean RSS error also reduces with the matrix completion. After learning, for example, for 10 minutes, the mean RSS error reduces to 1.93. This indicates that the matrix can gradually reflect the signal propagation in reality.

Figure 15:
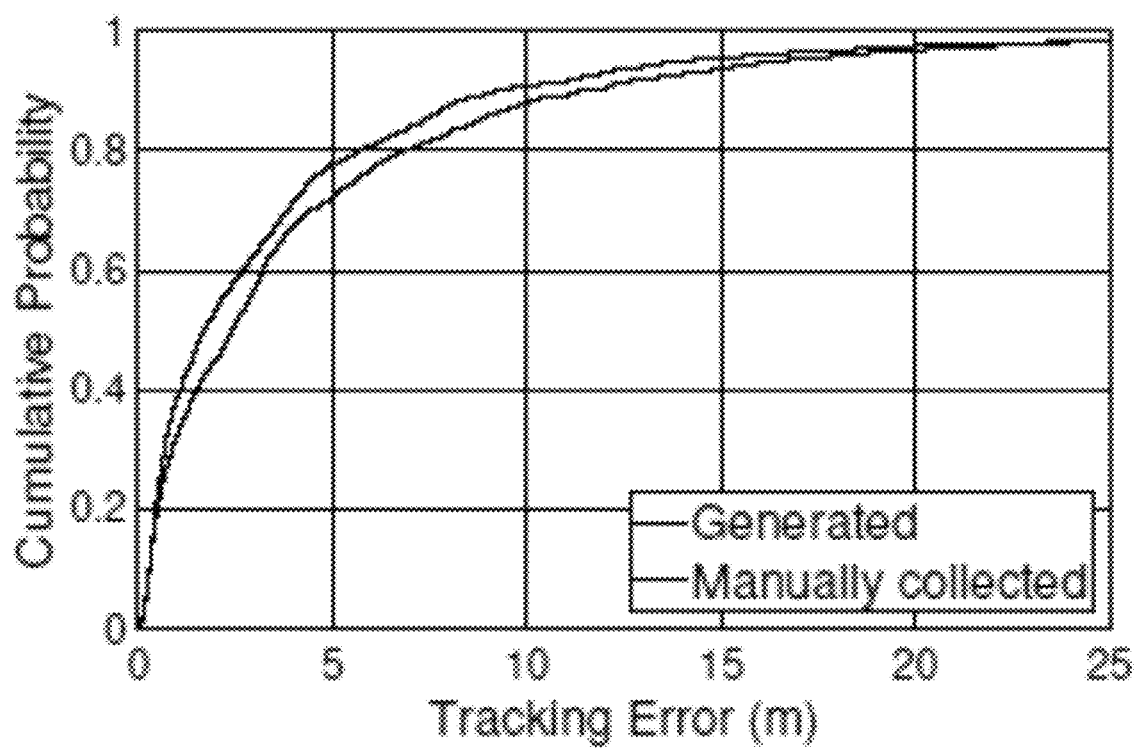
FIG. 15 provides illustration of a graph representing CDF tracking errors with different RSS matrices in regard to the example college campus environment, in accordance with described embodiments of the subject disclosure.

FIG. 15 shows the CDF of tracking error with different RSS matrices. A comparison between the effectiveness of generated RSS matrix with the manually collected one is depicted. In FIG. 15, the generated CDF curve is very close to the one by manual collection. The mean tracking error with generated RSS matrix is about 4.37, while the error with manually collected matrix is about 3.78.

Figure 16:
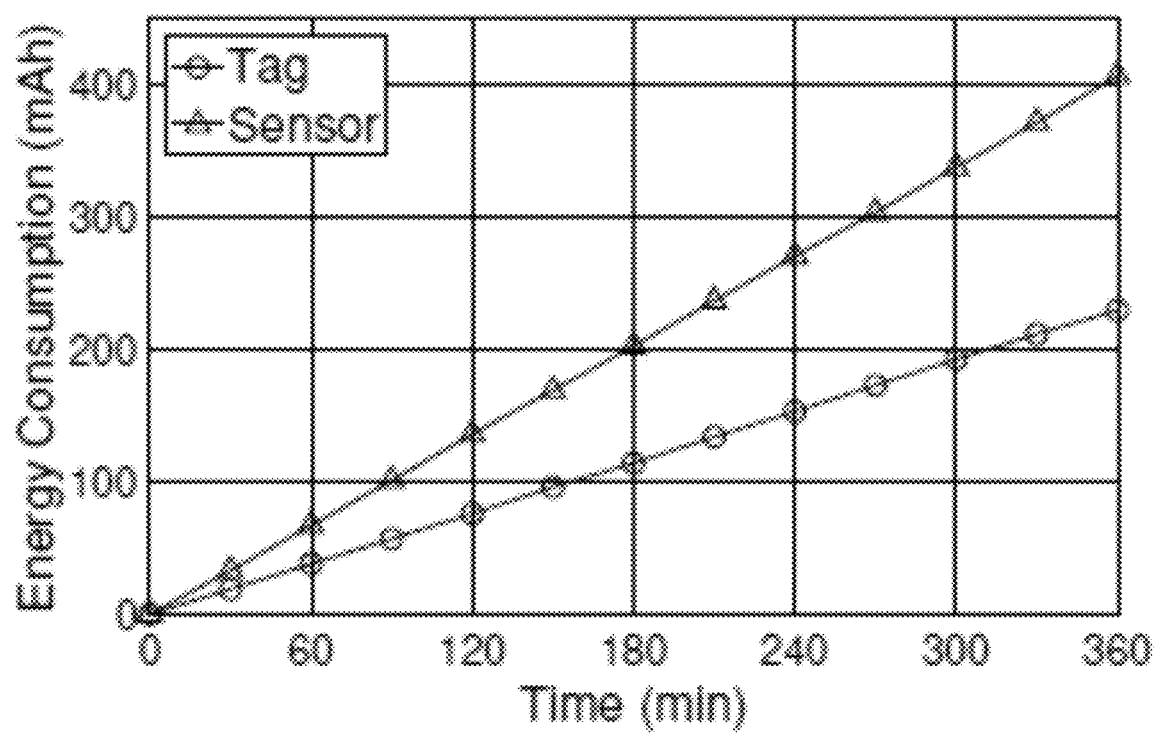
FIG. 16 provides illustration of a graph representing energy consumption verses time, in accordance with described embodiments of the subject disclosure.

A further experiment was conducted to monitor the power consumption of both target device and sensor device prototypes. Both devices were operable under 5V DC. No energy saving mode was configured. A USB-based power meter was used to keep measuring the power consumption for 6 hours. FIG. 16 shows the result over time. The power usage was quite linear during the whole test. The energy consumption of sensor devices was approximately 1.77 times to that of the target devices. This is mainly due to the overload of network communication and self-localization on the sensor devices. The subject application in accordance with various embodiments leverages target devices with low energy consumption to achieve a better accuracy than systems using sensor devices only.

In accordance with various embodiments, a device, system, and/or appartus is disclosed. The device, system, and/or appartus can comprise: a processor; and a memory that stores executable instructions that, when executed by the processor, facilitate performance of operations. The operations can comprise: as a function of sensing data representative of a location of a target device at a first defined time point and model data representative of a motion model of a probability density function, determining a group of locations for the target device at a second defined time period, wherein the probability density function facilitates a determination, based on the location of the target device at the first defined time point, a current location of the target device at a third defined time point; generating, based on the group of locations, a data structure representing a matrix of received signal strength values; and identifying, based on the data structure, a location of the group of locations for the target device at the second defined time point.

The sensing data can be received from a sensor device of a collection of sensor devices, wherein the sensor device can be located in an area circumscribed by a defined perimeter, and the area can be partitioned into a group of cells based on a generated Voronoi diagram. Further, a value associated with a count of the group of cells can be used to generate the data structure, wherein an entry of entries of the data structure can comprise an index value. Additionally, an entry of entries of the data structure can represent an received signal strength distribution comprising a mean of a signal strength emitted from a first cell of the group of cells and received by a second cell of the group of cells and a standard deviation of the signal strength emitted from the first cell and received by the second cell. Further, a cell of the group of cells can comprise a sensor device.

In accordance with additional and/or alternative embodiments a method is disclosed. The method can comprise acts that can comprise: as a function of sensing data representative of a location of a target device at a first defined moment and model data relating to a motion model representing a probability density function, determining, by a system comprising a processor, a group of locations for the target device at a second defined time point, wherein the probability density function facilitates determining, based on the location of the target device at the first defined moment, a current location of the target device at a third defined moment; and as a function of the group of locations, generating, by the system, a data structure representing a matrix of received signal strength values; and identifying, by the system, a location of the group of locations for the target device at the third defined moment based on the data structure.

Additional acts can include receiving, by the system, the sensing data from a sensor device of a grouping of sensor devices located in a defined area circumscribed by a defined boundary; facilitating, by the system, partitioning of the area into a grouping of cells based on a generated Voronoi diagram; and determining, by the system, a count value for the grouping of cells, and generating, by the system, a dimension of the data structure based on the count value.

In accordance with the foregoing method, an entry of entries of the data structure can comprise an index value; an entry of entries of the data structure can represent an received signal strength distribution comprising a mean of a signal strength emitted from a first cell of the grouping of cells and received by a second cell of the grouping of cells and a standard deviation of the signal strength emitted from the first cell and received by the second cell; and a cell of the grouping of cells can comprise a sensor device.

In accordance with further embodiments, a machine-readable storage medium or computer-readable storage medium, comprising executable instructions that, when executed by a processor, facilitate performance of operations is disclosed, The operations can comprise: based on model data representative of a motion model defining a probability density function, determining a group of locations for the target device at a third defined time period, wherein the that facilitates determining, as a function of a location of a target device at a first defined point in time obtained from sensing data, a current location of the target device at a second defined point in time; and based on the group of locations, generating a data structure representing a matrix of received signal strength values; and determining a location of the group of locations for the target device at the third defined point in time based on the data structure.

Additional operations can comprise: receiving the sensing data from a sensor device of a grouping of sensor devices located in a defined area circumscribed by a defined boundary; partitioning the defined area into a grouping of cells based on a generated Voronoi diagram; determining a count value for the grouping of cells, and generating a dimension of the data structure based on the count value, wherein an entry of entries of the data structure represents an received signal strength distribution comprising a mean of a signal strength emitted from a first cell of the grouping of cells and received by a second cell of the grouping of cells and a standard deviation of the signal strength emitted from the first cell and received by the second cell.

Figure 17:
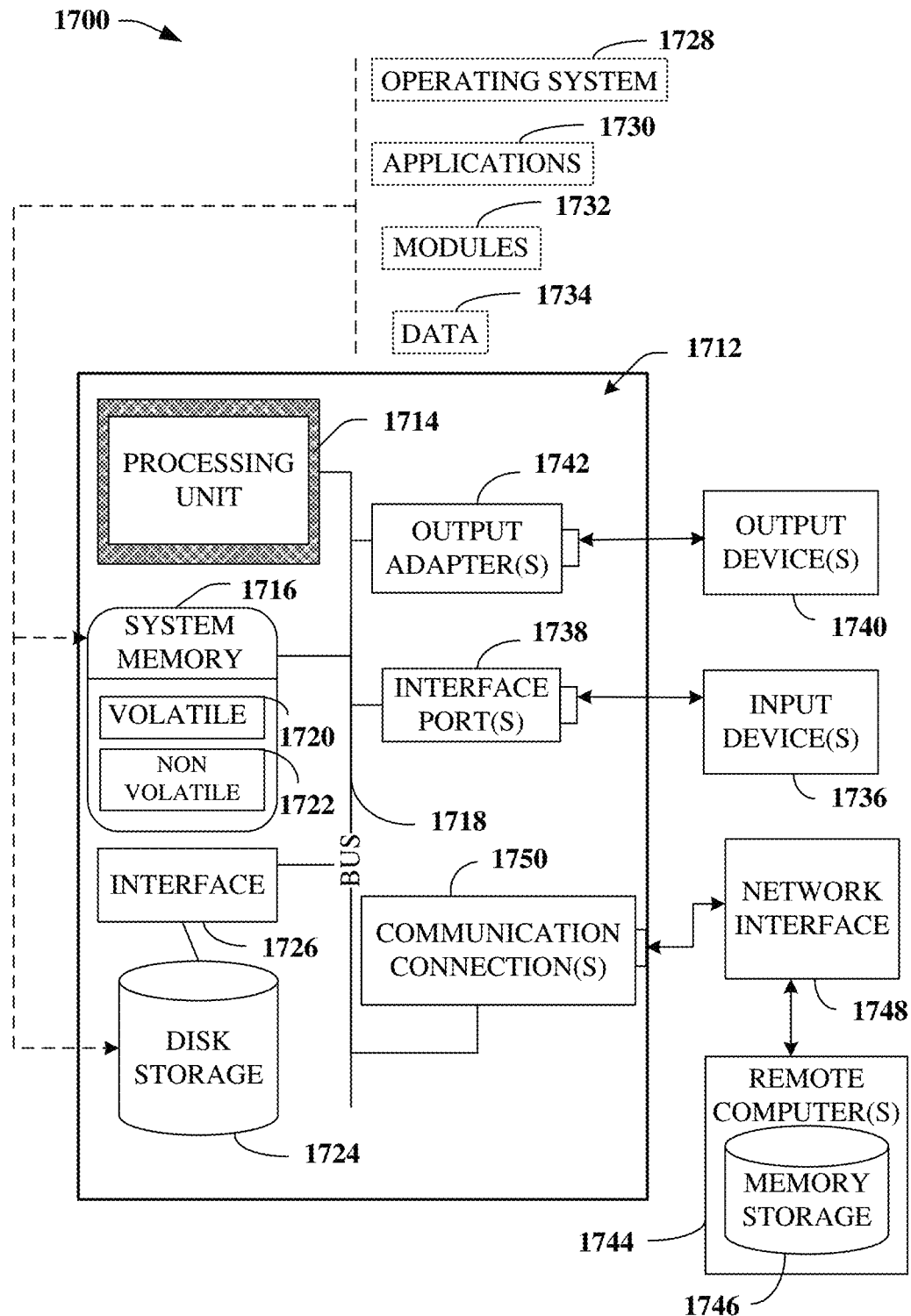
FIG. 17 illustrates a block diagram of a computing system operable to execute the disclosed systems and methods in accordance with an embodiment.

In order to provide a context for the various aspects of the disclosed subject matter, FIG. 17, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1720 (see below), non-volatile memory 1722 (see below), disk storage 1724 (see below), and memory storage 1746 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, notebook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 17 illustrates a block diagram of a computing system 1700 operable to execute the disclosed systems and methods in accordance with an embodiment. Computer 1712, which can be, for example, part of the hardware of system 170, includes a processing unit 1714, a system memory 1716, and a system bus 1718. System bus 1718 couples system components including, but not limited to, system memory 1716 to processing unit 1714. Processing unit 1714 can be any of various available processors. Dual microprocessors and other multiprocessor architectures also can be employed as processing unit 1714.

System bus 1718 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1716 can include volatile memory 1720 and nonvolatile memory 1722. A basic input/output system (BIOS), containing routines to transfer information between elements within computer 1712, such as during start-up, can be stored in nonvolatile memory 1722. By way of illustration, and not limitation, nonvolatile memory 1722 can include ROM, PROM, EPROM, EEPROM, or flash memory. Volatile memory 1720 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1712 can also include removable/non-removable, volatile/non-volatile computer storage media. FIG. 17 illustrates, for example, disk storage 1724. Disk storage 1724 includes, but is not limited to, devices like a magnetic disk drive, floppy disk drive, tape drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1724 to system bus 1718, a removable or non-removable interface is typically used, such as interface 1726.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 17 describes software that acts as an intermediary between users and computer resources described in suitable operating environment 1700. Such software includes an operating system 1728. Operating system 1728, which can be stored on disk storage 1724, acts to control and allocate resources of computer system 1712. System applications 1730 take advantage of the management of resources by operating system 1728 through program modules 1732 and program data 1734 stored either in system memory 1716 or on disk storage 1724. It is to be noted that the disclosed subject matter can be implemented with various operating systems or combinations of operating systems.

A user can enter commands or information into computer 1712 through input device(s) 1736. As an example, mobile device and/or portable device can include a user interface embodied in a touch sensitive display panel allowing a user to interact with computer 1712. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1714 through system bus 1718 by way of interface port(s) 1738. Interface port(s) 1738 include, for example, a serial port, a parallel port, a game port, a universal serial bus (USB), an infrared port, a Bluetooth port, an IP port, or a logical port associated with a wireless service, etc. Output device(s) 1740 use some of the same type of ports as input device(s) 1736.

Thus, for example, a USB port can be used to provide input to computer 1712 and to output information from computer 1712 to an output device 1740. Output adapter 1742 is provided to illustrate that there are some output devices 1740 like monitors, speakers, and printers, among other output devices 1740, which use special adapters. Output adapters 1742 include, by way of illustration and not limitation, video and sound cards that provide means of connection between output device 1740 and system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. Remote computer(s) 1744 can be a personal computer, a server, a router, a network PC, cloud storage, cloud service, a workstation, a microprocessor based appliance, a peer device, or other common network node and the like, and typically includes many or all of the elements described relative to computer 1712.

For purposes of brevity, only a memory storage device 1746 is illustrated with remote computer(s) 1744. Remote computer(s) 1744 is logically connected to computer 1712 through a network interface 1748 and then physically connected by way of communication connection 1750. Network interface 1748 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1750 refer(s) to hardware/software employed to connect network interface 1748 to bus 1718. While communication connection 1750 is shown for illustrative clarity inside computer 1712, it can also be external to computer 1712. The hardware/software for connection to network interface 1748 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations, comprising:
     as a function of sensing data representative of a location of a target device at a first defined time point and model data representative of a motion model of a probability density function, determining a group of locations for the target device at a second defined time period, wherein the probability density function facilitates a determination, based on the location of the target device at the first defined time point, of a current location of the target device at a third defined time point;
     generating, based on the group of locations, a data structure representing a matrix of received signal strength values representative of first values associated with the target device and second values associated with a collection of sensor devices, wherein the collection of sensor devices are distributed within an area circumscribed by a defined perimeter associated with the group of locations; and
     identifying, based on the data structure, a location of the group of locations for the target device at the second defined time point.

2. The device of claim 1, wherein the sensing data is received from a sensor device of the collection of sensor devices.

3. The device of claim 2, wherein the sensor device is located in the area circumscribed by the defined perimeter.

4. The device of claim 2, wherein the area is partitioned into a group of cells based on a generated Voronoi diagram.

5. The device of claim 4, wherein a value associated with a count of the group of cells is used to generate the data structure.

6. The device of claim 5, wherein an entry of entries of the data structure comprises an index value.

7. The device of claim 5, wherein an entry of entries of the data structure represents a received signal strength distribution comprising a mean of a signal strength emitted from a first cell of the group of cells and received by a second cell of the group of cells and a standard deviation of the signal strength emitted from the first cell and received by the second cell.

8. The device of claim 4, wherein a cell of the group of cells comprises a sensor device.

9. A method, comprising:
   as a function of sensing data representative of a location of a target device at a first defined moment of time and model data relating to a motion model representing a probability density function, determining, by a system comprising a processor, a group of locations for the target device at a second defined moment of time, wherein the probability density function facilitates determining, based on the location of the target device at the first defined moment of time, a current location of the target device at a third defined moment of time; and
   as a function of the group of locations, generating, by the system, a data structure representing a matrix of received signal strength values representative of first values associated with the target device and second values associated with a grouping of sensor devices, wherein the grouping of sensor devices are distributed within a defined area associated with the group of locations; and
   identifying, by the system, a location of the group of locations for the target device at the third defined moment of time based on the data structure.

10. The method of claim 9, further comprising receiving, by the system, the sensing data from a sensor device of the grouping of sensor devices located in the defined area circumscribed by a defined boundary.

11. The method of claim 10, further comprising facilitating, by the system, partitioning of the area into a grouping of cells based on a generated Voronoi diagram.

12. The method of claim 11, further comprising determining, by the system, a count value for the grouping of cells, and generating, by the system, a dimension of the data structure based on the count value.

13. The method of claim 12, wherein an entry of entries of the data structure comprises an index value.

14. The method of claim 12, wherein an entry of entries of the data structure represents a received signal strength distribution comprising a mean of a signal strength emitted from a first cell of the grouping of cells and received by a second cell of the grouping of cells and a standard deviation of the signal strength emitted from the first cell and received by the second cell.

15. The method of claim 12, wherein a cell of the grouping of cells comprises a sensor device.

16. A machine-readable storage medium, comprising executable instructions that, when executed by a processor, facilitate performance of operations, comprising:
   based on model data representative of a motion model defining a probability density function, determining a group of locations for the target device at a third defined time period, wherein the determining further facilitates determining, as a function of a location of a target device at a first defined point in time obtained from sensing data, a current location of the target device at a second defined point in time; and
   based on the group of locations, generating a data structure representing a matrix of received signal strength values representative of first values associated with the target device and second values associated with a collection of sensor devices, wherein the collection of sensor devices are distributed within a defined area associated with the group of locations; and determining a location of the group of locations for the target device at the third defined point in time based on the data structure.

17. The machine-readable storage medium of claim 16, the operations further comprise receiving the sensing data from a sensor device of the grouping of sensor devices located in the defined area circumscribed by a defined boundary.

18. The machine-readable storage medium of claim 17, the operations further comprise partitioning the defined area into a grouping of cells based on a generated Voronoi diagram.

19. The machine-readable storage medium of claim 18, the operations further comprise determining a count value for the grouping of cells, and generating a dimension of the data structure based on the count value.

20. The machine-readable storage medium of claim 18, wherein an entry of entries of the data structure represents a received signal strength distribution comprising a mean of a signal strength emitted from a first cell of the grouping of cells and received by a second cell of the grouping of cells and a standard deviation of the signal strength emitted from the first cell and received by the second cell.

* * * * *